(12) United States Patent
Ettes et al.

(10) Patent No.: US 12,489,321 B2
(45) Date of Patent: *Dec. 2, 2025

(54) WIRELESS POWER TRANSFER AND COMMUNICATION

(71) Applicant: KONINKLIJKE PHILIPS N.V., Eindhoven (NL)

(72) Inventors: Wilhelmus Gerardus Maria Ettes, Leeuwarden (NL); Klaas Jacob Lulofs, Veldhoven (NL); Pascal Leonard Maria Theodoor Lebens, Eindhoven (NL); Friso Rietstra, Drachten (NL)

(73) Assignee: Koninklijke Philips N.V., Eindhoven (NL)

( * ) Notice: Subject to any disclaimer, the term of this patent is extended or adjusted under 35 U.S.C. 154(b) by 0 days.

This patent is subject to a terminal disclaimer.

(21) Appl. No.: 18/581,463

(22) Filed: Feb. 20, 2024

(65) Prior Publication Data
US 2024/0195228 A1    Jun. 13, 2024

Related U.S. Application Data

(63) Continuation of application No. 17/779,185, filed as application No. PCT/EP2020/084427 on Dec. 3, 2020, now Pat. No. 11,936,208.

(30) Foreign Application Priority Data

Dec. 10, 2019    (EP) .................... 19214922

(51) Int. Cl.
*H02J 50/60*    (2016.01)
*H01F 38/14*    (2006.01)
*H02J 50/12*    (2016.01)

(52) U.S. Cl.
CPC .............. *H02J 50/60* (2016.02); *H01F 38/14* (2013.01); *H02J 50/12* (2016.02)

(58) Field of Classification Search
CPC ....................................... H02J 50/60
(Continued)

(56) References Cited

U.S. PATENT DOCUMENTS 9,882,393 B2    1/2018    Takeda et al.
11,038,381 B2   6/2021    Wegeningen et al.
(Continued)

FOREIGN PATENT DOCUMENTS

JP    2006230129 A    8/2006
WO    2012127335 A1   9/2012
(Continued)

OTHER PUBLICATIONS

Qi Wireless Power Transfer System, Power Class 0 Specification, parts 1 and 2: Interface Definitions, Version 1.2.2 of Apr. 2016.
(Continued)

*Primary Examiner* — Joseph Chang

(57) ABSTRACT

A power transmitter (101) comprises a driver (201) generating a drive signal for a transmitter coil to generate a power transfer signal during a power transfer time interval and an electromagnetic test signal during a foreign object detection time interval. A set of balanced detection coils (207, 209) comprise two detection coils arranged such that signals induced in the two detection coils by an electromagnetic field generated by the transmitter coil compensate each other. A foreign object detector (205) is coupled to the detection coils and performs foreign object detection during the foreign object detection time interval. The foreign object detector (205) is arranged to detect a foreign object in response to a property of a signal from the detection coils meeting a foreign object detection criterion. A transformer (1101) has a primary winding and a secondary winding coupled in series with the set of balanced detection coils A compensation circuit (1103) is coupled to the primary wind- (Continued)

ing and arranged to generate a compensation drive signal for the primary winding which offsets a combined voltage of the set of detection coils.

14 Claims, 20 Drawing Sheets

(58) Field of Classification Search
USPC .......................................................... 307/104
See application file for complete search history.

(56) References Cited

U.S. PATENT DOCUMENTS

| 11,303,152 | B2 | 4/2022 | Ettes et al. | |
|---|---|---|---|---|
| 11,936,208 | B2* | 3/2024 | Ettes | H01F 38/14 |
| 2017/0217536 | A1* | 8/2017 | Kipnis | B62M 1/28 |
| 2017/0288412 | A1* | 10/2017 | Yamamoto | H02J 50/70 |
| 2017/0317536 | A1 | 11/2017 | Marson et al. | |
| 2018/0316229 | A1* | 11/2018 | Anwer | H02J 50/60 |
| 2019/0312467 | A1* | 10/2019 | Mynar | H02J 50/12 |
| 2019/0349028 | A1 | 11/2019 | Louis | |
| 2020/0212725 | A1* | 7/2020 | Van Wageningen | H02J 50/60 |
| 2020/0280220 | A1 | 9/2020 | Ettes et al. | |
| 2020/0395793 | A1 | 12/2020 | Ettes et al. | |

FOREIGN PATENT DOCUMENTS

| WO | 2015018868 A1 | 2/2015 |
|---|---|---|
| WO | 2018219793 A1 | 12/2018 |
| WO | 2019003785 A1 | 1/2019 |
| WO | 2019053194 A1 | 3/2019 |
| WO | 2019057777 A1 | 3/2019 |

OTHER PUBLICATIONS

International Search Report and Written Opinion from PCT/EP2020/084693 mailed Feb. 22, 2021.

* cited by examiner

WIRELESS POWER TRANSFER AND COMMUNICATION

CROSS-REFERENCE TO PRIOR APPLICATIONS

This application is a continuation of a U.S. patent application Ser. No. 17/779,185 filed May 24, 2022, which is a continuation of International Application No. PCT/EP2020/084427, filed on Dec. 3, 2020, which claims the benefit of EP Patent Application No. EP 19214922.7, filed on Oct. 12, 2019. These applications are hereby incorporated by reference herein.

FIELD OF THE INVENTION

The invention relates to foreign object detection in a wireless power transfer system and in particular, but not exclusively, to foreign object detection for a power transmitter providing inductive power transfer to higher power devices, such as e.g. kitchen appliances.

BACKGROUND OF THE INVENTION

Most present-day electrical products require a dedicated electrical contact in order to be powered from an external power supply. However, this tends to be impractical and requires the user to physically insert connectors or otherwise establish a physical electrical contact. Typically, power requirements also differ significantly, and currently most devices are provided with their own dedicated power supply resulting in a typical user having a large number of different power supplies with each power supply being dedicated to a specific device. Although, the use of internal batteries may avoid the need for a wired connection to a power supply during use, this only provides a partial solution as the batteries will need recharging (or replacing). The use of batteries may also add substantially to the weight and potentially cost and size of the devices.

In order to provide a significantly improved user experience, it has been proposed to use a wireless power supply wherein power is inductively transferred from a transmitter inductor in a power transmitter device to a receiver coil in the individual devices.

Power transmission via magnetic induction is a well-known concept, mostly applied in transformers having a tight coupling between a primary transmitter inductor/coil and a secondary receiver coil. By separating the primary transmitter coil and the secondary receiver coil between two devices, wireless power transfer between these becomes possible based on the principle of a loosely coupled transformer.

Such an arrangement allows a wireless power transfer to the device without requiring any wires or physical electrical connections to be made. Indeed, it may simply allow a device to be placed adjacent to, or on top of, the transmitter coil in order to be recharged or powered externally. For example, power transmitter devices may be arranged with a horizontal surface on which a device can simply be placed in order to be powered.

Furthermore, such wireless power transfer arrangements may advantageously be designed such that the power transmitter device can be used with a range of power receiver devices. In particular, a wireless power transfer approach, known as the Qi Specifications, has been defined and is currently being further developed. This approach allows power transmitter devices that meet the Qi Specifications to be used with power receiver devices that also meet the Qi Specifications without these having to be from the same manufacturer or having to be dedicated to each other. The Qi standard further includes some functionality for allowing the operation to be adapted to the specific power receiver device (e.g. dependent on the specific power drain).

The Qi Specification is developed by the Wireless Power Consortium and more information can e.g. be found on their website: http://www.wirelesspowerconsortium.com/index-.html, where in particular the defined Specification documents can be found.

A potential problem with wireless power transfer is that power may unintentionally be transferred to e.g. metallic objects that happen to be in the vicinity of the power transmitter. For example, if a foreign object, such as e.g. a coin, key, ring etc., is placed upon the power transmitter platform arranged to receive a power receiver, the magnetic flux generated by the transmitter coil will introduce eddy currents in the metal objects which will cause the objects to heat up. The heat increase may be very significant and may be highly disadvantageous.

In order to reduce the risk of such scenarios arising, it has been proposed to introduce foreign object detection where the power transmitter can detect the presence of a foreign object and reduce the transmit power and/or generate a user alert when a positive detection occurs. For example, the Qi system includes functionality for detecting a foreign object, and for reducing power if a foreign object is detected. Specifically, Qi specification version 1.2.1, section 11 describes various methods of detecting a foreign object.

One method to detect such foreign objects is disclosed in WO2015018868A1. Another example is provided in WO 2012127335 which discloses an approach based on determining unknown power losses. In the approach, both the power receiver and the power transmitter measure their power, and the receiver communicates its measured received power to the power transmitter. When the power transmitter detects a significant difference between the power sent by the transmitter and the power received by the receiver, an unwanted foreign object may potentially be present, and the power transfer may be reduced or aborted for safety reasons. This power loss method requires synchronized accurate power measurements performed by the power transmitter and the power receiver.

For example, in the Qi power transfer standard, the power receiver estimates its received power e.g. by measuring the rectified voltage and current, multiplying them and adding an estimate of the internal power losses in the power receiver (e.g. losses of the rectifier, the receiver coil, metal parts being part of the receiver etc.). The power receiver reports the determined received power to the power transmitter with a minimum rate of e.g. every four seconds.

The power transmitter estimates its transmitted power, e.g. by measuring the DC input voltage and current of the inverter, multiplying them and correcting the result by subtracting an estimation of the internal power losses in the transmitter, such as e.g. the estimated power loss in the inverter, the primary coil, and metal parts that are part of the power transmitter.

The power transmitter can estimate the power loss by subtracting the reported received power from the transmitted power. If the difference exceeds a threshold, the transmitter will assume that too much power is dissipated in a foreign object, and it can then proceed to terminate the power transfer.

Alternatively, it has been proposed to measure the quality or Q-factor of the resonant circuit formed by the primary coil and secondary coil together with the corresponding capacitances and resistances. A reduction in the measured Q-factor may be indicative of a foreign object being present. This approach is often used prior to power transfer.

In practice, it tends to be difficult to achieve sufficient detection accuracy using the methods described in the Qi specification. This difficulty is exacerbated by a number of uncertainties about the specific current operating conditions.

For example, a particular problem is the potential presence of friendly metals (i.e. metal parts of the device that embodies the power receiver or the power transmitter) as the magnetic and electrical properties of these may be unknown (and vary between different devices) and therefore may be difficult to compensate for.

Further, undesirable heating may result from even relatively small amounts of power being dissipated in a metallic foreign object. Therefore, it is necessary to detect even a small power discrepancy between the transmitted and received power, and this may be particularly difficult when the power levels of the power transfer increase.

The Q factor degradation approach may in many scenarios have a better sensitivity for detecting the presence of metal objects. However, it may still not provide sufficient accuracy and e.g. may also suffer from the influence of friendly metal.

The performance of the foreign object detection is subject to the specific operating conditions that are present when the test is actually performed. For example, if, as described in the Qi specification, a measurement for foreign object detection is performed in the Selection Phase of a power transfer initialization process, the signal that the power transmitter provides for the measurement must be small enough to prevent that it wakes up the power receiver. However, for such a small signal, the signal/noise ratio is typically poor, resulting in reduced accuracy of the measurement.

Another issue is that foreign object detection is typically a very sensitive test where it is desired that relatively small changes caused by the presence of a foreign object is detected in an environment with possibly a large variation of the operating conditions and scenarios for which the test is being performed.

The problems tend to be exacerbated for higher power levels and the current developments for wireless power trends tend to be towards higher power level transfers. For example, the Wireless Power Consortium is developing the Cordless Kitchen Specification which is intended to support high power levels up to 2000 W or potentially even higher. For higher power levels, the foreign object detection algorithms need to be more accurate to prevent heating of foreign objects above a safe temperature. Indeed, the temperature rise is given by the absolute power level, and thus for higher power level the relative power loss that needs to be detected may be reduced substantially.

It has been proposed in WO2019053194 to during power transfer operate the foreign object detection in time slots in which the load of the power receiver is switched off in order to enable a smaller absolute power level dissipated in a foreign object to be detected. However, disconnecting a load during a foreign object detection may be problematic in many high power applications as a disconnection switch will typically introduce additional losses and/or the increase of cost. Also, for many applications, it is not feasible to implement such disconnection, such as for example if the load is a heating element that is heated by the power transmitter generating an electromagnetic field that directly generates eddy currents in the heating element.

Also, for higher power levels, the detection accuracy of the foreign object detection becomes increasingly critical, and thus the requirements for an accurate measurement approach becomes increasingly strict. Indeed, many of the foreign object detection approaches that are suitable for low power usage are unsuitable for detection for higher power transfers.

Current approaches and measurement techniques for foreign object detection tend to be suboptimal and may in some scenarios and examples provide less than optimum performance. In particular, they may result in the presence of foreign objects not being detected, or in false detections of foreign objects when none are present. Further, more accurate approaches tend to be complex and expensive.

Hence, an improved object detection would be advantageous and, in particular, an approach allowing increased flexibility, reduced cost, reduced complexity, improved object detection, fewer false detections and missed detections, backwards compatibility, improved suitability for higher power level transfers, and/or improved performance would be advantageous.

SUMMARY OF THE INVENTION

Accordingly, the Invention seeks to preferably mitigate, alleviate or eliminate one or more of the above mentioned disadvantages singly or in any combination.

According to an aspect of the invention there is provided a power transmitter for wirelessly providing power to a power receiver via an inductive power transfer signal; the power transmitter comprising: a transmitter coil; a driver for generating a drive signal for the transmitter coil, the driver being arranged to generate the drive signal for the transmitter coil to generate the power transfer signal during at least one power transfer time interval of a repeating time frame and to generate the drive signal for the transmitter coil to generate an electromagnetic test signal during at least one foreign object detection time interval of the repeating time frame; a set of balanced detection coils coupled in series, the set of balanced detection coils comprising two detection coils arranged such that signals induced in the two detection coils by an electromagnetic field generated by the transmitter coil compensate each other; a foreign object detector coupled to the set of balanced detection coils and arranged to perform foreign object detection during the foreign object detection time interval, the foreign object detector being arranged to detect a foreign object in response to a property of a signal from the set of balanced detection coils meeting a foreign object detection criterion; a transformer having a primary winding and a secondary winding, the secondary winding being coupled in series with the set of balanced detection coils; and a compensation circuit coupled to the primary winding and arranged to generate a compensation drive signal for the primary winding, the compensation drive signal offsetting a combined voltage of the set of detection coils The invention may provide improved foreign object detection in many embodiments. In many scenarios and systems, a more accurate foreign object detection may be achieved. The approach may in many embodiments reduce complexity. Specifically, the approach may be particularly suitable for improving foreign object detection in higher power level power transfer systems.

The approach may allow improved accuracy and/or reliability of foreign object detection tests during the power transfer phase. In many embodiments, the approach may reduce uncertainty for the foreign object detection tests thereby improving performance.

The approach may in many embodiments provide a reduced sensitivity to implementation inaccuracies, such as e.g. imbalances and variations in the geometries of detection coils.

The invention may provide improved and/or facilitated foreign object detection in many embodiments and scenarios. The approach may provide a particularly efficient approach for improving detection accuracy when using balanced detection coils. It may in be highly suitable to be used with a first transformer generating a signal to be evaluated but may also be used without such a transformer.

The compensation approach may in particular allow and/or improve position estimation for a foreign object.

The foreign object detection time interval of the repeating time frame may specifically be timed to coincide with/include, be synchronized with zero crossings of the power transfer signals. The compensation drive signal may be generated such that the secondary winding generates a signal that offsets/at least partially cancels the combined voltage of the first set of balanced detection coils. The compensation drive signal may be generated such that it results in an offsetting/at least partially cancelling of the combined voltage when no foreign object is present.

In many embodiments, a duration of the foreign object detection time interval is no more than 5%, 10%, or 20% of the duration of the time frame. In many embodiments, the duration of the foreign object detection time interval(s) is no less than 70%, 80%, or 90% of the time frame. A duration of the foreign object detection time interval(s) may in many scenarios not exceed 5 msec, 10 msec, or 50 msec.

The detection coils are balanced in that the detection coils are arranged such that signals induced in the two detection coils by an electromagnetic field generated by the transmitter coil compensate each other. The combined voltage over the two balanced detection coils is lower than the largest of the voltages over each of the two balanced detection coils. The compensation may be an at least partial cancellation of the two signals.

The secondary winding may have fewer turns than the primary winding.

The foreign object detector may be arranged to determine that a foreign object is detected if a phase and/or amplitude signal from the detection coils exceeds a threshold.

The electromagnetic test signal may also be referred to as a test electromagnetic field and the terms may be considered interchangeable. The detection coils/winding being coupled in series means that the current through the detection coils/winding is identical.

In accordance with an optional feature of the invention, a combined resistance of a coupling between the set of balanced detection coils and the secondary winding is less than 100 Ohm.

This may provide improved and/or facilitated foreign object detection in many embodiments and scenarios. In some embodiments, the combined resistance of a coupling between the set of balanced detection coils and the secondary winding is less than 50, 10, 5 or 1 Ohm. The resistance may be the resistive (real) component of the impedance of the (series) coupling/connection.

In accordance with an optional feature of the invention, a number of turns of the secondary winding is no less than ten times lower than a number of turns of the primary winding.

This may provide improved and/or facilitated foreign object detection in many embodiments and scenarios.

In accordance with an optional feature of the invention, the compensation circuit is arranged to generate the compensation drive signal to have a frequency matching a frequency of the drive signal during the foreign object detection time intervals.

This may provide improved and/or facilitated compensation in many embodiments, leading to improved and/or facilitated foreign object detection.

In accordance with an optional feature of the invention, the compensation circuit is arranged to dynamically adapt a parameter of the drive signal, the parameter being at least one of a voltage amplitude, and a phase of the drive signal.

This may provide improved and/or facilitated compensation in many embodiments, leading to improved and/or facilitated foreign object detection.

In accordance with an optional feature of the invention, the compensation circuit is arranged to vary the parameter of the drive signal to determine a reference parameter value for which the signal from the first secondary winding has a minimum amplitude, and to set the drive signal to the reference parameter value when performing foreign object detection.

This may provide improved and/or facilitated compensation in many embodiments, leading to improved and/or facilitated foreign object detection.

In accordance with an optional feature of the invention, the apparatus comprises: a plurality of sets of balanced detection coils including the set of balanced detection coils and at least a second set of balanced detection coils comprising two detection coils arranged such that signals induced in the two detection coils by an electromagnetic field generated by the transmitter coil compensate each other; a switch circuit for time sequentially coupling one of the plurality of balanced detection coils to the secondary winding via a series coupling; and wherein the compensation circuit is arranged to apply different parameter values for the drive signal depending on which set of balanced detection coils is coupled to the secondary winding.

This may provide improved and/or facilitated compensation in many embodiments, leading to improved and/or facilitated foreign object detection.

In accordance with an optional feature of the invention, a frequency of the drive signal during the foreign object detection time interval is no lower than 50% higher than a frequency of the drive signal during power transfer time interval.

This may provide improved and/or facilitated foreign object detection in many embodiments. It may in particular provide reduced impact of the loading by a load of the power receiver and be detune e.g. a resonant load. The reduced impact of the load may result in more accurate foreign object detection in many embodiments.

In some embodiments the frequency of the drive signal during the foreign object detection time interval is no less than 100%, or even 200% higher than a frequency of the drive signal during power transfer time interval.

In accordance with an optional feature of the invention, a voltage amplitude of the drive signal during the foreign object detection time interval is no higher than 50% of a voltage amplitude of the drive signal during power transfer time intervals.

This may provide improved and/or facilitated foreign object detection in many embodiments. It may in particular provide reduced impact of the loading by a load of the power receiver and be detune e.g. a resonant load. The reduced impact of the load may result in more accurate foreign object detection in many embodiments.

In some embodiments, the voltage amplitude of the drive signal during the foreign object detection time interval is no higher than 25% or 10% of a voltage amplitude of the drive signal during power transfer time intervals.

In accordance with an optional feature of the invention, a voltage amplitude of the drive signal is constant during the foreign object detection time interval.

This may provide improved and/or facilitated foreign object detection in many embodiments.

In accordance with an aspect of the invention, there is provided a method of operation of a power transmitter for wirelessly providing power to a power receiver via an inductive power transfer signal; the power transmitter comprising: a transmitter coil; a set of balanced detection coils coupled in series, the set of balanced detection coils comprising two detection coils arranged such that signals induced in the two detection coils by an electromagnetic field generated by the transmitter coil compensate each other; a transformer having a primary winding and a secondary winding, the secondary winding being coupled in series with the set of balanced detection coils; the method comprising: a driver for generating a drive signal for the transmitter coil, the driver being arranged to generate the drive signal for the transmitter coil to generate the power transfer signal during at least one power transfer time interval of a repeating time frame and to generate the drive signal for the transmitter coil to generate an electromagnetic test signal during at least one foreign object detection time interval of the repeating time frame; a foreign object detector coupled to the set of balanced detection coils and arranged to perform foreign object detection during the foreign object detection time interval, the foreign object detector being arranged to detect a foreign object in response to a property of a signal from the set of balanced detection coils meeting a foreign object detection criterion; a compensation circuit coupled to the primary winding and arranged to generate a compensation drive signal for the primary winding, the compensation drive signal offsetting a combined voltage of the set of detection coils.

In accordance with another aspect of the invention, there is provided a power transmitter for wirelessly providing power to a power receiver via an inductive power transfer signal; the power transmitter comprising: a transmitter coil; a driver for generating a drive signal for the transmitter coil, the driver being arranged to generate the drive signal for the transmitter coil to generate the power transfer signal during at least one power transfer time interval of a repeating time frame and to generate the drive signal for the transmitter coil to generate an electromagnetic test signal during at least one foreign object detection time interval of the repeating time frame; a first set of balanced detection coils coupled in series, the first set of balanced detection coils comprising two detection coils arranged such that signals induced in the two detection coils by an electromagnetic field generated by the transmitter coil compensate each other; a first transformer having a first secondary winding and first primary winding, the first primary winding being coupled in series with the first set of balanced detection coils; a foreign object detector coupled to the first secondary winding and arranged to perform foreign object detection during the foreign object detection time interval, the foreign object detector being arranged to detect a foreign object in response to a property of a signal from the first secondary winding meeting a foreign object detection criterion.

The approach may provide improved foreign object detection in many embodiments. In many scenarios and systems, a more accurate foreign object detection may be achieved.

The approach may in many embodiments reduce complexity. Specifically, the approach may be particularly suitable for improving foreign object detection in higher power level power transfer systems.

The approach may allow improved accuracy and/or reliability of foreign object detection tests during the power transfer phase. In many embodiments, the approach may reduce uncertainty for the foreign object detection tests thereby improving performance.

The approach may in many embodiments provide a reduced sensitivity to noise, such as e.g. noise generated by a switching output circuit of the driver.

In many embodiments, a duration of the foreign object detection time interval is no more than 5%, 10%, or 20% of the duration of the time frame. In many embodiments, the duration of the foreign object detection time interval(s) is no less than 70%, 80%, or 90% of the time frame. A duration of the foreign object detection time interval(s) may in many scenarios not exceed 5 msec, 10 msec, or 50 msec.

The detection coils are balanced in that the detection coils are arranged such that signals induced in the two detection coils by an electromagnetic field generated by the transmitter coil compensate each other. The combined voltage over the two balanced detection coils is lower than the largest of the voltages over each of the two balanced detection coils. The compensation may be an at least partial cancellation of the two signals.

The first primary winding may have fewer turns than the first secondary winding. The first transformer may be arranged to perform impedance transformation from a lower impedance for the first primary winding to a higher impedance for the second primary winding.

The foreign object detector may be arranged to determine that a foreign object is detected if a phase and/or amplitude signal from the first secondary winding exceeds a threshold.

The electromagnetic test signal may also be referred to as a test electromagnetic field and the terms may be considered interchangeable. The detection coils/winding being coupled in series means that the current through the detection coils/winding is identical.

In accordance with an optional feature of the invention, the secondary winding is passively loaded.

The secondary winding may be connected to a load circuit which provides a passive load to the secondary winding. The secondary winding may be connected to a circuit which does not provide any power to the secondary winding. The signal/voltage/current in the secondary winding may originate only from a signal induced in the set or sets of balanced detection coils.

In accordance with an optional feature of the invention, the set of balanced detection coils is passively loaded.

The set of balanced detection coils may be connected to a load circuit which provides a passive load to the set of balanced detection coils. The set of balanced detection coils may be connected to a circuit (including the first transformer) which does not provide any power to the set of balanced detection coils. The signal/voltage/current in the balanced detection coils may originate only from induction in the set or sets of balanced detection coils.

The foreign object detector may be arranged to detect the foreign object in response to a property of an induced signal from the first secondary winding meeting a foreign object detection criterion, the induced signal being a signal induced in the first set of balanced detection coils.

The power transmitter may be arranged to convey energy from the balanced detection coils to the foreign object detector.

In accordance with an optional feature of the invention, the apparatus further comprises at least a first resonance capacitor coupled to the first secondary winding to form a resonance circuit, a resonance frequency of the resonance circuit having a frequency substantially equal to a frequency of the electromagnetic test signal.

This may provide improved and/or facilitated foreign object detection in many embodiments and scenarios. It may in particular reduce noise sensitivity and facilitate measurements for foreign object detection evaluation.

In accordance with an optional feature of the invention, a combined resistance of a coupling between the first set of balanced detection coils and the first primary winding is less than 100 Ohm.

This may provide improved and/or facilitated foreign object detection in many embodiments and scenarios. In some embodiments, the combined resistance of a coupling between the first set of balanced detection coils and the first primary winding is less than 50, 10, 5 or 1 Ohm. The resistance may be the resistive (real) component of the impedance of the (series) coupling/connection.

In accordance with an optional feature of the invention, a number of turns of the first secondary winding is no less than ten times higher than a number of turns of the first primary winding.

This may provide improved and/or facilitated foreign object detection in many embodiments and scenarios.

In accordance with an optional feature of the invention, the apparatus comprises a plurality of sets of balanced detection coils including the first set of balanced detection coils and at least a second set of balanced detection coils comprising two detection coils arranged such that signals induced in the two detection coils by an electromagnetic field generated by the transmitter coil compensate each other; and the foreign object detector is arranged to perform foreign object detection in response to an output signal from the at least second set of balanced detection coils.

This may provide improved and/or facilitated foreign object detection in many embodiments and scenarios.

In accordance with an optional feature of the invention, the apparatus further comprises a switch circuit for time sequentially coupling one of the plurality of balanced detection coils to the first primary winding via a series coupling; and the foreign object detector is arranged to perform the foreign object detection in response to properties of the signal from the first secondary winding for at least two of the plurality of balanced detection coils being coupled to the first current transformer.

This may provide improved and/or facilitated foreign object detection in many embodiments and scenarios.

In accordance with an optional feature of the invention, the switch circuit is arranged to switch between coupling different sets of balanced detection coils of the plurality of balanced detection coils to the first primary winding between consecutive foreign object detection time intervals.

This may provide improved and/or facilitated foreign object detection in many embodiments and scenarios.

In accordance with an optional feature of the invention, the switch circuit is arranged to switch between coupling different sets of balanced detection coils of the plurality of balanced detection coils to the first primary winding during one foreign object detection time interval.

This may provide improved and/or facilitated foreign object detection in many embodiments and scenarios.

In accordance with an optional feature of the invention, the foreign object detector is arranged to determine a position indication estimate in response to the properties of the signal from the first secondary winding for at least two of the plurality of balanced detection coils being coupled to the first transformer.

This may provide additional information on the foreign object in many embodiments and scenarios.

In accordance with an optional feature of the invention, the plurality of sets of balanced detection coils are positioned within the transmitter coil.

This may provide improved and/or facilitated foreign object detection in many embodiments and scenarios.

The transmitter coil and the detection coils may be planar coils and the area covered by the detection coils may be within the area covered by the transmitter coil. The electromagnetic field lines of the electromagnetic test signal that go through a detection coil may also go through the transmitter coil.

The power transmitter may comprise: a plurality of sets of balanced detection coils including the first set of balanced detection coils and at least a second set of balanced detection coils comprising two detection coils arranged such that signals induced in the two detection coils by an electromagnetic field generated by the transmitter coil compensate each other; a switch circuit for time sequentially coupling one of the plurality of balanced detection coils to the first primary winding via a series coupling; and wherein the compensation circuit is arranged to apply different parameter values for the drive signal depending on which set of balanced detection coils is coupled to the first primary winding.

This may provide improved and/or facilitated compensation in many embodiments, leading to improved and/or facilitated foreign object detection.

A frequency of the drive signal during the foreign object detection time interval may be no lower than 50% higher than a frequency of the drive signal during power transfer time interval.

This may provide improved and/or facilitated foreign object detection in many embodiments. It may in particular provide reduced impact of the loading by a load of the power receiver and be detune e.g. a resonant load. The reduced impact of the load may result in more accurate foreign object detection in many embodiments.

The frequency of the drive signal during the foreign object detection time interval may be no less than 100%, or even 200% higher than a frequency of the drive signal during power transfer time interval.

A voltage amplitude of the drive signal during the foreign object detection time interval may be no higher than 50% of a voltage amplitude of the drive signal during power transfer time intervals.

This may provide improved and/or facilitated foreign object detection in many embodiments. It may in particular provide reduced impact of the loading by a load of the power receiver and be detune e.g. a resonant load. The reduced impact of the load may result in more accurate foreign object detection in many embodiments.

The voltage amplitude of the drive signal during the foreign object detection time interval may be no higher than 25% or 10% of a voltage amplitude of the drive signal during power transfer time intervals.

A voltage amplitude of the drive signal may be constant during the foreign object detection time interval.

This may provide improved and/or facilitated foreign object detection in many embodiments.

There may be provided method of operation for a power transmitter for wirelessly providing power to a power receiver via an inductive power transfer signal; the power transmitter comprising: a transmitter coil; a set of balanced detection coils coupled in series, the set of balanced detection coils comprising two detection coils arranged such that signals induced in the two detection coils by an electromagnetic field generated by the transmitter coil compensate each other; a transformer having a secondary winding and primary winding, the primary winding being coupled in series with the set of balanced detection coils; and the method comprises: generating a drive signal for the transmitter coil to generate the power transfer signal during at least one power transfer time interval of a repeating time frame and to generate an electromagnetic test signal during at least one foreign object detection time interval of the repeating time frame; and performing foreign object detection during the foreign object detection time interval, the foreign object detector being arranged to detect a foreign object in response to a property of a signal from the secondary winding meeting a foreign object detection criterion.

In some systems, the following may be provided:

A power transmitter for wirelessly providing power to a power receiver via an inductive power transfer signal; the power transmitter comprising: a transmitter coil; a driver for generating a drive signal for the transmitter coil, the driver being arranged to generate the drive signal for the transmitter coil to generate the power transfer signal during at least one power transfer time interval of a repeating time frame and to generate the drive signal for the transmitter coil to generate an electromagnetic test signal during at least one foreign object detection time interval of the repeating time frame; a set of balanced detection coils coupled in series, the set of balanced detection coils comprising two detection coils arranged such that signals induced in the two detection coils by an electromagnetic field generated by the transmitter coil compensate each other; a foreign object detector coupled to the set of balanced detection coils and arranged to perform foreign object detection during the foreign object detection time interval, the foreign object detector being arranged to detect a foreign object in response to a property of a signal from the set of balanced detection coils meeting a foreign object detection criterion; wherein the driver is arranged to generate the drive signal such that a frequency of the drive signal during the foreign object detection time interval is no lower than 50% higher than a frequency of the drive signal during power transfer time interval.

A power transmitter for wirelessly providing power to a power receiver via an inductive power transfer signal; the power transmitter comprising: a transmitter coil; a driver for generating a drive signal for the transmitter coil, the driver being arranged to generate the drive signal for the transmitter coil to generate the power transfer signal during at least one power transfer time interval of a repeating time frame and to generate the drive signal for the transmitter coil to generate an electromagnetic test signal during at least one foreign object detection time interval of the repeating time frame; a set of balanced detection coils coupled in series, the set of balanced detection coils comprising two detection coils arranged such that signals induced in the two detection coils by an electromagnetic field generated by the transmitter coil compensate each other; a foreign object detector coupled to the set of balanced detection coils and arranged to perform foreign object detection during the foreign object detection time interval, the foreign object detector being arranged to detect a foreign object in response to a property of a signal from the set of balanced detection coils meeting a foreign object detection criterion; wherein the driver is arranged to generate the drive signal such that a voltage amplitude of the drive signal during the foreign object detection time interval is no higher than 50% of a voltage amplitude of the drive signal during power transfer time intervals.

These and other aspects, features and advantages of the invention will be apparent from and elucidated with reference to the embodiment(s) described hereinafter.

BRIEF DESCRIPTION OF THE DRAWINGS

Embodiments of the invention will be described, by way of example only, with reference to the drawings, in which.

DETAILED DESCRIPTION OF THE EMBODIMENTS

The following description focuses on embodiments of the invention applicable to a wireless power transfer system utilizing a power transfer approach such as known from the Qi specification or the Cordless Kitchen Specification. However, it will be appreciated that the invention is not limited to this application but may be applied to many other wireless power transfer systems.

Figure 1:
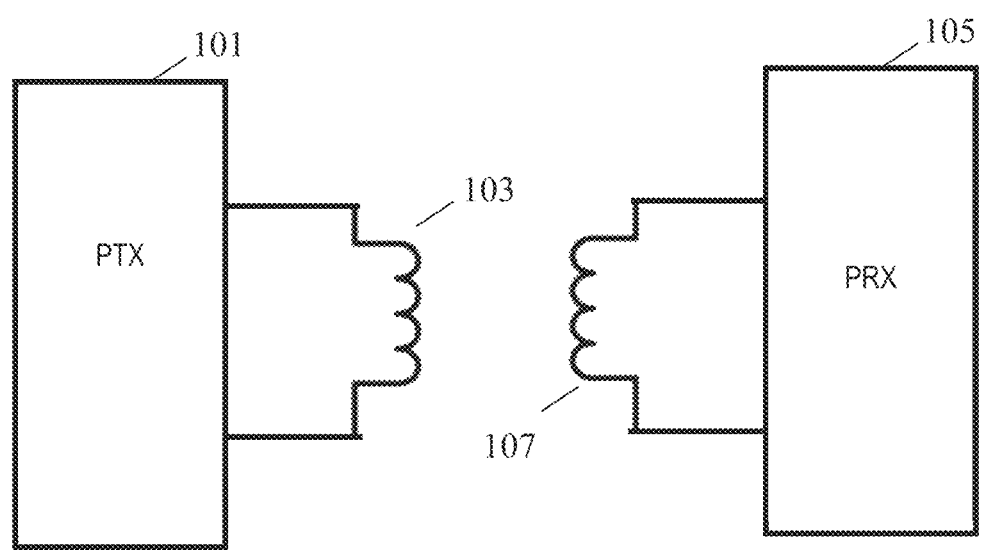
FIG. 1 illustrates an example of elements of a power transfer system in accordance with some embodiments of the invention.

FIG. 1 illustrates an example of a power transfer system in accordance with some embodiments of the invention. The power transfer system comprises a power transmitter 101 which includes (or is coupled to) a transmitter coil/inductor 103. The system further comprises a power receiver 105 which includes (or is coupled to) a receiver coil/inductor 107.

The system provides an electromagnetic power transfer signal which may inductively transfer power from the power transmitter 101 to the power receiver 105. Specifically, the power transmitter 101 generates an electromagnetic signal, which is propagated as a magnetic flux by the transmitter coil or inductor 103. The power transfer signal may typically have a frequency between around 20 kHz to around 500 kHz, and often for Qi compatible systems typically in the range from 95 kHz to 205 kHz (or e.g. for high power kitchen applications, the frequency may e.g. typically be in the range between 20 kHz to 80 kHz). The transmitter coil 103 and the power receiving coil 107 are loosely coupled and thus the power receiving coil 107 picks up (at least part of) the power transfer signal from the power transmitter 101. Thus, the power is transferred from the power transmitter 101 to the power receiver 105 via a wireless inductive coupling from the transmitter coil 103 to the power receiving coil 107. The term power transfer signal is mainly used to refer to the inductive signal/magnetic field between the transmitter coil 103 and the power receiving coil 107 (the magnetic flux signal), but it will be appreciated that by equivalence it may also be considered and used as a reference to an electrical signal provided to the transmitter coil 103 or picked up by the power receiving coil 107.

In the example, the power receiver 105 is specifically a power receiver that receives power via the receiver coil 107. However, in other embodiments, the power receiver 105 may comprise a metallic element, such as a metallic heating element, in which case the power transfer signal directly induces eddy currents resulting in a direct heating of the element.

The system is arranged to transfer substantial power levels, and specifically the power transmitter may support power levels in excess of 500 mW, 1 W, 5 W, 50 W, 100 W or 500 W in many embodiments. For example, for Qi corresponding applications, the power transfers may typically be in the 1-5 W power range for low power applications (the basic power profile), up to 15 W for Qi specification version 1.2, in the range up to 100 W for higher power applications such as power tools, laptops, drones, robots etc., and in excess of 100 W and up to more than 1000 W for very high power applications, such as e.g. kitchen applications.

In the following, the operation of the power transmitter 101 and the power receiver 105 will be described with specific reference to an embodiment generally in accordance with the Qi Specification (except for the herein described (or consequential) modifications and enhancements) or suitable for the higher power kitchen specification being developed by the Wireless Power Consortium. In particular, the power transmitter 101 and the power receiver 105 may follow, or substantially be compatible with, elements of the Qi Specification version 1.0, 1.1 or 1.2 (except for the herein described (or consequential) modifications and enhancements).

In wireless power transfer systems, the presence of an object (typically a conductive element extracting power from the power transfer signal and not being part of the power transmitter 101 or the power receiver 105, i.e. being an unintended, undesired, and/or interfering element to the power transfer) may be highly disadvantageous during a power transfer. Such an undesired object is in the field known as a foreign object.

A foreign object may not only reduce efficiency by adding a power loss to the operation but may also degrade the power transfer operation itself (e.g. by interfering with the power transfer efficiency or extracting power not directly controlled e.g. by the power transfer loop). In addition, the induction of currents in the foreign object (specifically eddy currents in the metal part of a foreign object) may result in an often highly undesirable heating of the foreign object.

In order to address such scenarios, wireless power transfer systems such as Qi or the Cordless Kitchen Specification include functionality for foreign object detection. Specifically, the power transmitter comprises functionality seeking to detect whether a foreign object is present. If so, the power transmitter may e.g. terminate the power transfer or reduce the maximum amount of power that can be transferred.

Foreign object detection may be performed before a power receiver enters the power transfer phase (e.g. during the initialization of the power transfer) or during the power transfer phase. Detection during the power transfer phase is often based on comparisons of measured transmitted power and received power whereas detection that take place before the power transfer phase is often based on measurements of a reflected impedance, e.g. by measuring the quality factor of the transmitter coil by using a small measurement signal.

Current approaches proposed by the Qi Specifications are based on detecting a power loss (by comparing the transmitted and the reported received power) or detecting degradations in the quality Q of the output resonance circuit. However, in current use these approaches have been found to provide suboptimal performance in many scenarios, and they may specifically lead to inaccurate detection resulting in missed detections and/or false positives where a foreign object is detected despite no such object being present.

Conventional foreign object detection tends to be suboptimal, partly due to variations and uncertainties in the specific operating conditions and scenarios in which the foreign object detection is performed, including variations and uncertainties in the power transmitter properties, power receiver properties, test conditions applied etc.

An example of the challenges to foreign object detection tests is the requirement to perform sufficiently accurate measurements in order to achieve a sufficiently reliable foreign object detection. This may lead to a desire to generate as powerful a signal as possible in order to increase the detection accuracy. However, this may increase power consumption in the power receiver and in any foreign object present. The detection performance may be sensitive to the specific signal level applied and there will typically be conflicting requirements.

The system of FIG. 1 uses an approach for foreign object detection that seeks to provide improved trade-offs for foreign object detection. The approach may in many embodiments provide improved foreign object detection and specifically may in many embodiments provide a more accurate and/or reliable foreign object detection. The approach may further allow low complexity and low resource requirements.

As will be described in more detail in the following, the approach utilizes a time division approach during the power transfer phase wherein foreign object detection and power transfer may e.g. be performed in separate time intervals thereby allowing the interference between these (specifically the impact of the power transfer on the foreign object detection) to be reduced substantially.

In the following, the system of FIG. 1 will be described in more detail. In the example, the electromagnetic power transfer signal and the electromagnetic test signal used for the foreign object detection are generated by the same coil. Further, the signals/fields will be referred to by different terms, namely the electromagnetic signal/field generated during power transfer time intervals will be referred to as the power transfer signal and the electromagnetic signal/field generated during foreign object detection time intervals will be referred to as the electromagnetic test signal, or just the test signal.

Figure 2:
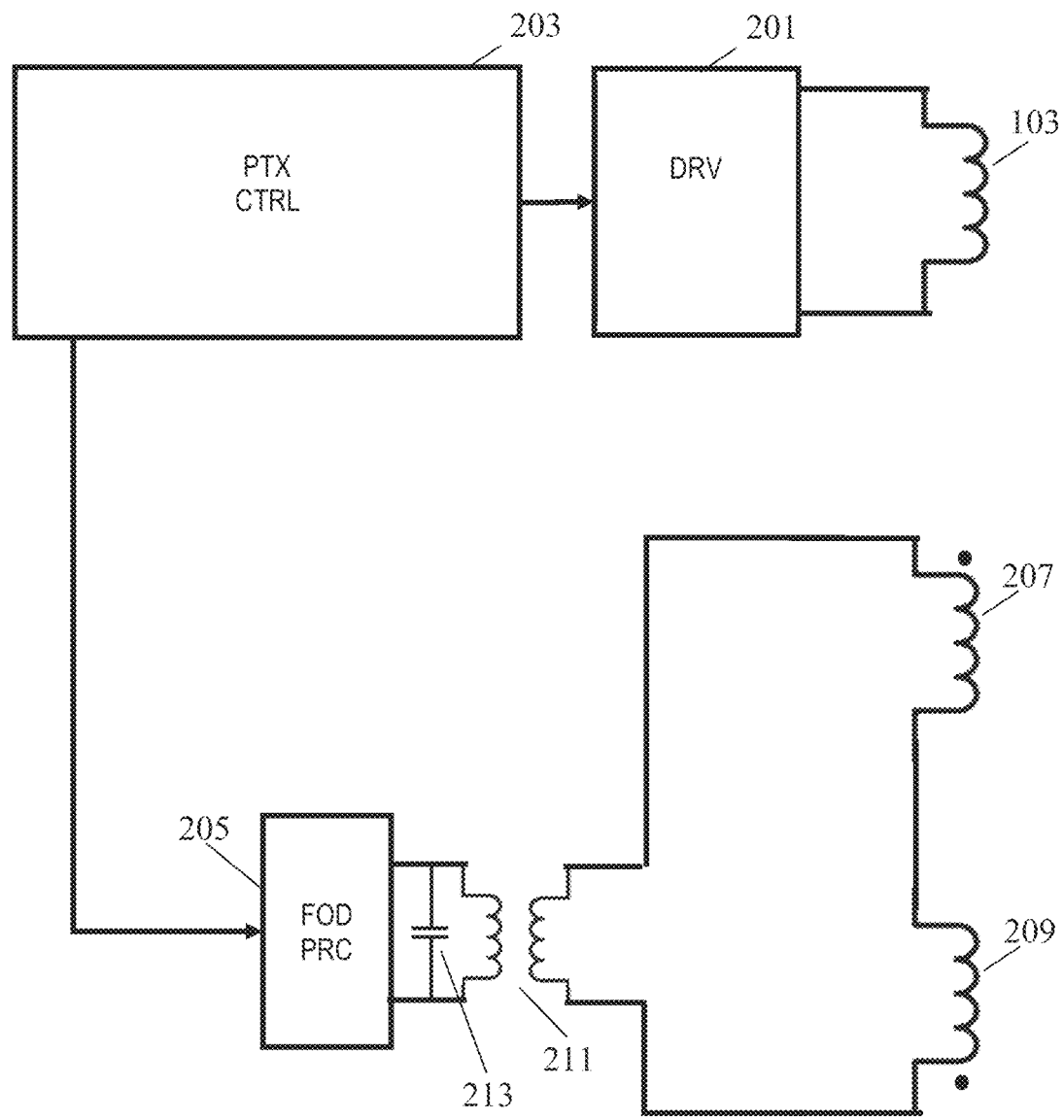
FIG. 2 illustrates an example of elements of a power transmitter in accordance with some embodiments of the invention.

FIG. 2 illustrates elements of the power transmitter 101 of FIG. 1 in more detail.

The power transmitter 101 includes a driver 201 which can generate a drive signal that is fed to the transmitter coil 103 which in return generates the electromagnetic power transfer signal thereby providing a power transfer to the power receiver 105. The power transfer signal is provided during power transfer time intervals of the power transfer phase.

Figure 3:
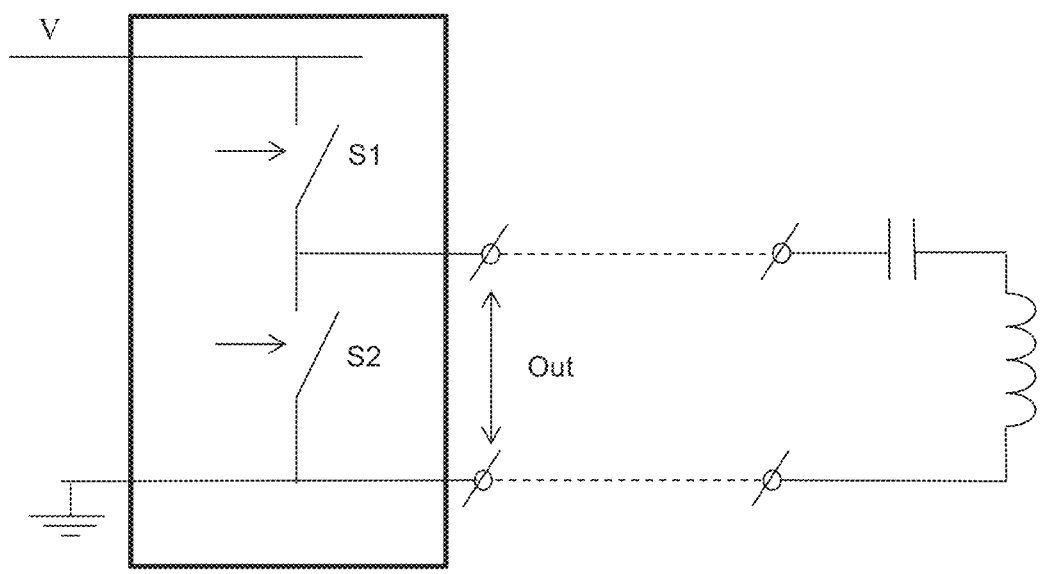
FIG. 3 illustrates an example of a half bridge inverter for a power transmitter.
Figure 4:
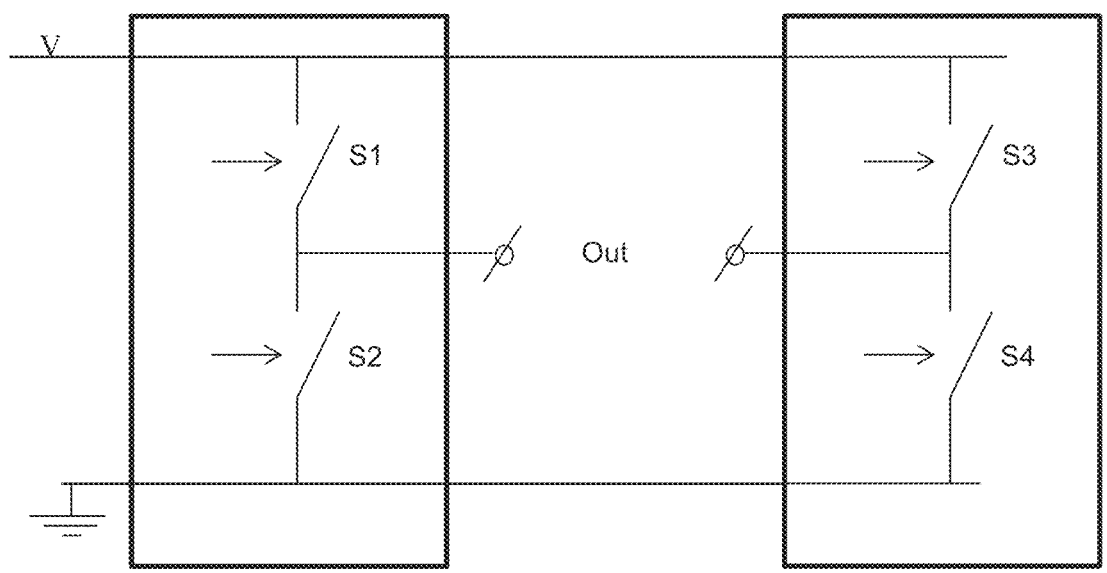
FIG. 4 illustrates an example of a full bridge inverter for a power transmitter.

The driver 201 generates the current and voltage which is fed to the transmitter inductor 103. The driver 201 is typically a drive circuit in the form of an inverter which generates an alternating signal from a DC Voltage. The output of the driver 201 is typically a switch bridge generating the drive signal by the appropriate switching of switches of the switch bridge. FIG. 3 shows a half-bridge switch bridge/inverter. The switches S1 and S2 are controlled such that they are never closed at the same time. Alternatingly S1 is closed while S2 is open and S2 is closed while S1 is open. The switches are opened and closed with the desired frequency, thereby generating an alternating signal at the output. Typically, the output of the inverter is connected to the transmitter inductor via a resonance capacitor. FIG. 4 shows a full-bridge switch bridge/inverter. The switches S1 and S2 are controlled such that they are never closed at the same time. The switches S3 and S4 are controlled such that they are never closed at the same time. Alternatingly switches S1 and S4 are closed while S2 and S3 are open, and then S2 and S3 are closed while S1 and S4 or open, thereby creating a square-wave signal at the output. The switches are opened and closed with the desired frequency.

The power transmitter 101 further comprises a power transmitter controller 203 which is arranged to control the operation of the power transmitter 101 in accordance with the desired operating principles. Specifically, the power transmitter 101 may include many of the functionalities required to perform power control in accordance with the Qi Specifications or the Cordless Kitchen Specification.

The power transmitter controller 203 is in particular arranged to control the generation of the drive signal by the driver 201, and it can specifically control the power level of the drive signal, and accordingly the level of the generated power transfer signal. The power transmitter controller 203 comprises a power loop controller controlling a power level of the power transfer signal in response to the power control messages received from the power receiver 105 during the power control phase.

The system of FIG. 1 uses an approach for foreign object detection that seeks to adapt operation to provide improved trade-offs for foreign object detection. The approach may in many embodiments provide improved foreign object detection and specifically may in many embodiments provide a more accurate and/or reliable foreign object detection. The approach may further allow low complexity and low resource requirements.

Figure 5:
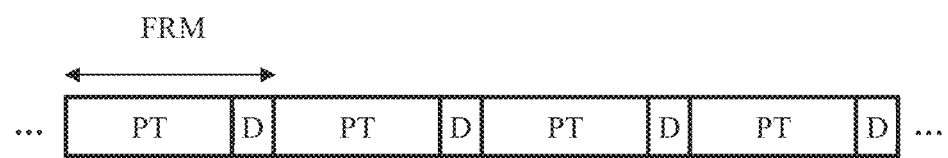
FIG. 5 illustrates an example of a time frame for the wireless power transfer system of FIG. 1.

In the example, the driver 201 and the transmitter coil 103 are arranged to generate both an electromagnetic power transfer signal for the purpose of transferring power to a power receiver and an electromagnetic test signal used for foreign object detection. The power transmitter may employ a repeating time frame for the drive signal during the power transfer phase where the time frame comprises at least one power transfer time interval and one foreign object detection time interval. An example of such a repeating time frame is illustrated in FIG. 5 where power transfer time intervals are indicated by PT and foreign object detection time intervals are indicated by D. In the example, each time frame FRM comprises only one foreign object detection time interval and one power transfer time interval and these (as well as the time frame itself) have the same duration in each frame. However, it will be appreciated that in other embodiments, other time intervals may also be included in a time frame (such as e.g. communication intervals) or a plurality of foreign object detection time intervals and/or power transfer time intervals may be included in each time frame. Furthermore, the duration of the different time intervals (and indeed the time frame itself) may in some embodiments vary dynamically.

In the approach, the foreign object detection and the power transfer is thus separated in the time domain thereby resulting in reduced cross-interference from the power transfer to the foreign object detection. Thus, the variability and uncertainty resulting from variations in the operating conditions for the power transfer can be isolated from the foreign object detection resulting in a more reliable and accurate foreign object detection.

In the power transfer phase, the power transmitter is thus arranged to perform power transfer during the power transfer time interval of the time frames. Specifically, during these time intervals, the power transmitter 101 and the power receiver 105 may operate a power control loop (the power control loop may be based on communication within the power transfer time interval or may e.g. be based on communication outside of the power transfer time interval, such as in dedicated communication time intervals. For example, each foreign object time interval may be separated by a plurality of alternating power transfer time intervals and communication time intervals. Thus, the level of the power being transferred may be dynamically varied. In the foreign object detection time intervals of the time frames of the power transfer phase, at least one parameter of the drive signal, and thus of the electromagnetic test signal, is typically set to a predetermined value, or e.g. a value determined during an adaptation operation performed prior to the foreign object detection time interval. Thus, in the foreign object detection time interval, the parameter may be set to a predetermined value (i.e. being determined prior to the foreign object detection time interval, and often prior to the power transfer phase). In contrast, the parameter may not be constrained to this predetermined value during power transfer time intervals.

For example, during a power transfer time interval, the system may operate a power control loop which allows the power level of the power transfer signal to be varied in response to power control messages from the power receiver. The power control loop may control/change at least one of a current, voltage, and frequency of the drive signal/power transfer signal. In contrast, during a foreign object detection time interval, the parameter varied by the power control loop during the power transfer time interval may be set to a predetermined value for the current, voltage and/or frequency determined prior to the power transfer phase.

In many embodiments, a constant (typically lower) amplitude (typically voltage) of the drive signal is set during the foreign object detection time intervals. Additionally or alternatively, a predetermined frequency may be set for the drive signal during the foreign object detection time interval and this may typically be substantially higher than the drive signal during the power transfer time intervals.

As a result, the generated electromagnetic signal during the power transfer time intervals, the power transfer signal, typically has substantially different properties than the generated electromagnetic signal during the foreign object detection time intervals, the electromagnetic test signal. The electromagnetic signal or field generated during power transfer time intervals will be referred to as the power transfer signal and the electromagnetic signal or field generated during foreign object detection time intervals will be referred to as the electromagnetic test signal, or just the test signal. However, it will be appreciated that in the system of FIG. 2, the electromagnetic signal is generated from the same coil in both the power transfer time interval and the foreign object detection time interval, and indeed the same driver etc. is used for both the power transfer time interval and the foreign object detection time interval. Indeed, the references to the test signal may in many embodiments be considered equivalent to the power transfer signal during the foreign object detection time interval.

The power transmitter 101 comprises a foreign object detector 205 which is arranged to perform foreign object detection tests, i.e. to specifically detect whether any undesired conductive elements are likely to be present within the generated electromagnetic field.

During an interval in which foreign object detection is performed, i.e. during a foreign object detection time interval, the foreign object detector 205 thus evaluates conditions to determine whether a foreign object is considered present or not. During the foreign object detection time interval, the power transmitter 101 generates an electromagnetic test signal and the foreign object detection is based on evaluating characteristics and properties of this signal.

In the system, the foreign object detection is based on detecting signals induced by the electromagnetic test signal in a set of balanced detection coils which comprises at least two detection coils 207, 209 that are arranged such that they negatively offset each other in the presence of a homogenous magnetic field, and in the presence of an electromagnetic field generated by the transmitter coil 103, such as specifically the electromagnetic test signal. Specifically, the power transmitter comprises a first detection coil 207 and a second detection coil 209 which are coupled such that electromagnetic field generated by the transmitter coil (at least partially) compensate each other.

Thus, the electromagnetic field generated by the transmitter coil 103 will induce a signal in the first detection coil 207 and will induce a signal in the second detection coil 209. However, the induced voltages will have opposite polarity such that the voltage (amplitude) of the series coupling of the detection coils 207, 209 resulting from the electromagnetic field generated by the transmitter coil 103 is lower than the voltage (amplitude) over at least the largest and typically of either of the individual detection coils 207, 209 resulting from the electromagnetic field generated by the transmitter coil 103. Thus, the first detection coil 207 and second detection coil 209 are coupled such that the induced voltages from the electromagnetic field generated by the transmitter coil 103 at least partially cancels each other.

The detection coils are specifically arranged to correspond to at least two windings in which opposing signals are generated by the electromagnetic test signal when no foreign objects are present. The opposing signals may thus at least partially cancel each other and accordingly the level of the measured induced signal across the series coupling of the detection coils 207, 209 will be reduced, and potentially substantially be cancelled. This may allow much increased magnetic field strengths to be used for the foreign object detection. Indeed, in many embodiments and scenarios, the resulting induced voltage may (ideally) be due only to differences in magnetic flux between the windings. Such differences or asymmetry between the windings may be caused by foreign objects and thus a more accurate measurement of the effect of a foreign object on the magnetic field (and thus induced signal) can be achieved in many scenarios.

Figure 6:
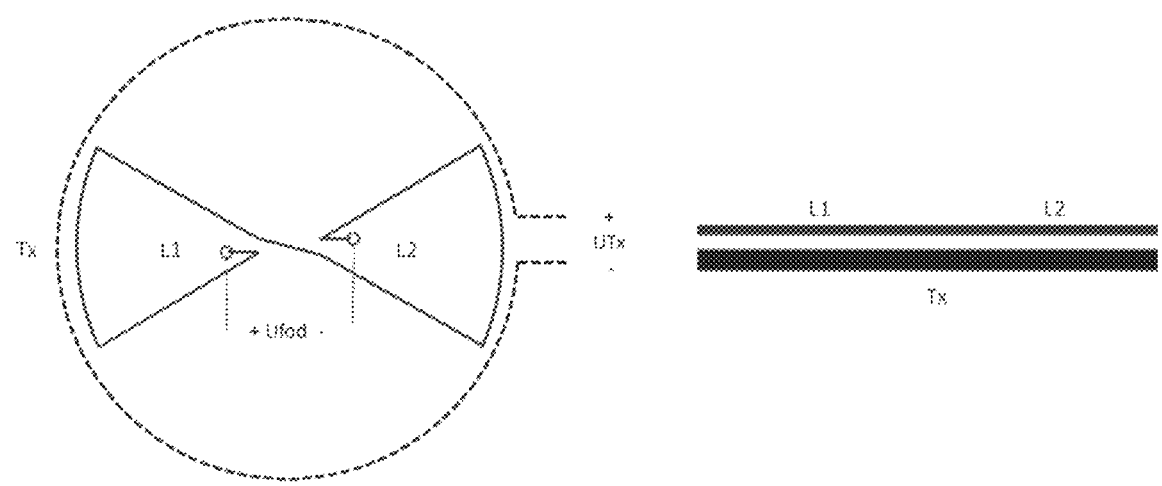
FIG. 6 illustrates an example of detection coils for a power transmitter in accordance with some embodiments of the invention.

An example of a detection coil arrangement is shown in FIG. 6. In the example the first detection coil 207 is formed as a first winding L1 and the second detection coil 209 is formed as a second winding L2 coupled in (anti) series such that the combined voltage of the two windings offset each other for a homogenous electromagnetic field. In the example, the detection coils 207, 209/windings L1, L2 are located opposite and symmetrically around a center point. They are further formed in a plane and the transmitter coil 103 is further formed in the same plane (or at least a substantially parallel plane). In the example, the detection coils 213 are formed inside the transmitter coil 103. Further the detection coils 213 are formed to have substantially the same outline and cover substantially the same area.

As a consequence, the electromagnetic flux through the two detection coils 213 is substantially the same but in opposite directions. As a consequence, the induced voltage in the two detection coils 207, 209 is substantially the same but with the opposite phase/polarity and the combined voltage over the two series coupled detection coils 213 is cancelled to substantially zero.

Thus the detection coils 207, 209 are arranged such that in the presence of a homogenous field, and/or in the presence of an electromagnetic field generated by the transmitter coil 103 with no other objects present, the induced signals/voltages at least partially cancels/compensates each other, ideally resulting in a zero combined voltage.

The arrangement of FIGS. 2 and 6 is such that an induced signal of a first of the two detection coils has an opposite voltage of an induced signal of a second of the two detection coils. The induced signals for the two detection coils have opposite phases for a homogenous field. The induced signals in the two detection coils have opposite phases. The two detection coils are coupled in series and in opposite phase such that the induced signals have opposite polarity. These properties exist for a homogeneous field and for the undistorted field generated by the transmitter coil 103.

Figure 7:
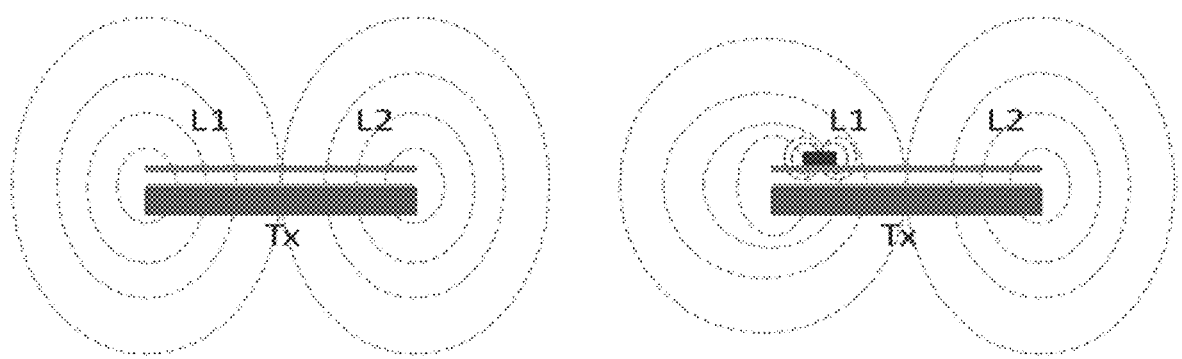
FIG. 7 illustrates an example of electromagnetic fields and detection coils for a power transmitter in accordance with some embodiments of the invention.

However, in the present of a metallic foreign object, the magnetic field will be distorted typically resulting in an asymmetry between the field for the two detection coils 207, 209. Typically, for a metallic foreign object, the generated electromagnetic test signal will induce eddy currents, which results in the foreign object generating an electromagnetic field such that the combined electromagnetic field is distorted relative to the field of the generated electromagnetic test signal. The resulting asymmetric field will result in different signals being induced in the first detection coil 207 and the second detection coil 209 as indicated by FIG. 7. Thus, in contrast to the situation where no foreign object is present and the flux through the two detection coils 207, 209 is symmetric resulting in a substantially zero combined voltage, the presence of the foreign object results in asymmetry and therefore a resulting voltage. This difference in the induced signal of the two detection coils 207, 209 can be used to detect the presence of the foreign object.

In the system of FIG. 2, the combined voltage of the pair of detection coils 207, 209 is not measured directly and used to perform a foreign object detection. Rather, the detection coils are coupled in series with a first transformer 211 such that the current through the detection coils 207, 209 also flow through the primary winding of the first transformer 211. Thus, the detection coils 207, 209 and the primary winding are part of a series circuit through which current induced in the detection coils 207, 209 flows.

It is noted that a primary winding of a transformer is a winding that draws power/energy from a source and a secondary winding is a winding that delivers the energy to a load, i.e. energy is transferred from the primary to the secondary winding.

The circuit may comprise other components and elements but in the specific example, the coupling between the detection coils 207, 209 and the primary winding is low ohmic. In most embodiments, the combined resistance of the coupling between the detection coils 207, 209 and the primary winding is less than 100 Ohm, and in many embodiments less than 50 Ohm, 10 Ohm, 5 Ohm, or even 1 Ohm in many embodiments. In many embodiments, the primary winding may, as shown in FIG. 2, be coupled directly to the detection coils 207, 209.

The first transformer 211 is in the example implemented as current transformer rather than a voltage transformer. Specifically, the first transformer 211 is arranged to have a winding ratio where the number of turns on the secondary winding is substantially higher than the number of turns on the primary winding. In many embodiments, the number of turns of the secondary winding is no less than 10, 20, 50, or 100 times higher than the number of turns on the primary winding.

The first transformer 211 may thus provide a very large impedance transformation such that even a relatively high impedance on the secondary winding will result in a very low impedance on the primary winding. Thus, the primary winding impedance of the first transformer 211 may be very low thereby resulting in a low voltage and high current. Further, as the coupling to the detection coils 207, 209 has a low impedance, the detection circuit formed by the detection coils 207, 209, the primary winding of the first transformer 211, and the coupling between these has a low overall impedance resulting in low voltages and high currents. Indeed, in many situations, the currents in the detection coils 207, 209 will create magnetic fields opposing the fields from the transmitter coil 103 typically resulting in a detection circuit in which the voltages are very close to zero but with a substantial current flowing.

The impedance of the primary winding of the first transformer 211 may correspond to the impedance on the secondary winding divided by the square of the turn ratio between the second winding and the primary winding. In many embodiments, the primary impedance may be arranged to be no more than 1 Ohm, 10 Ohm, or 50 Ohm for all frequencies. Thus, in many embodiments, the secondary impedance may be arranged to be no more than 1 Ohm, 10 Ohm, or 50 Ohm multiplied by the turn ratio squared.

The first transformer 211 is thus coupled such that it exhibits a low impedance to the detection coils 207, 209. Thus, the detection circuit essentially becomes a current measurement circuit.

The secondary of the first transformer 211 is coupled to the foreign object detector 205 which is arranged to perform foreign object detection during the foreign object detection time interval based on a property of a signal from the first secondary winding. If the signal meets a suitable foreign object detection criterion, it is determined that a foreign object is present, and if not, it is determined that no foreign object is present. The specific foreign object detection criterion will depend on the specific preferences and requirements of the individual embodiment. In many embodiments, it may require that an amplitude of the signal at the secondary of the first transformer 211 is above a threshold, for example it may require that an amplitude of the voltage and/or current of the secondary winding exceeds a threshold.

In many embodiments, the secondary winding may be coupled to a load that is at least partially capacitive. In the example of FIG. 2, the power transmitter specifically comprises a resonance capacitor 213 which is coupled to the first secondary winding to form a resonance circuit. The resonance capacitor 213 may specifically be coupled to form a parallel resonance circuit.

The resonance capacitor 213 may be specifically be arranged to form a resonance circuit that has a resonance frequency which is substantially equal to a frequency of the electromagnetic test signal/drive signal during the foreign object detection time interval (say, within 1%, 2%, or 5% of the electromagnetic test signal). Thus, the resonance circuit is tuned to the electromagnetic test signal which may achieve an improved detection amplitude and reduce e.g. noise and interference picked up by the detection coils 207, 209.

In the specific example, the resonance circuit together with the secondary winding form a parallel resonance with a particularly high impedance at the drive signal/electromagnetic test signal frequency. This maximizes and filters the voltage for the secondary winding allowing an improved foreign object detection performance. For example, the foreign object detector 205 may in many embodiments simply compare the voltage amplitude for the voltage over the resonance circuit and generate a detection indication when this amplitude exceeds a given threshold. In many embodiments, it may be advantageous to perform a phase detection where the foreign object is designated to be detected if the phase deviates too much from an expected reference phase. This is particularly suited for the current approach where the generated detection signal is a near sinusoidal (symmetrical) signal.

The use of a resonance capacitor 213 forming a parallel resonance with the secondary winding results in the highest impedance being at the resonance frequency i.e. at the frequency of the electromagnetic test signal. Further, a resistor may be added in parallel to the resonance circuit such that the quality Q (the selectivity) can be controlled (e.g. in the range from 1 to 3). In this case, the L-C-R parallel combination behaves like a band pass filter with a controlled maximum impedance. The band pass filtering may result in a near sinusoidal shaped voltage at the terminals In many embodiments, the secondary impedance at the resonance frequency may be arranged to be no more than 1 Ohm, 10 Ohm, or 50 Ohm multiplied by the turn ratio squared.

The approach of using a measurement (current) transformer together with balanced detection coils provides an improved foreign object detection in many scenarios and allows the power transmitter to be used at increased power levels. It further allows a low complexity and may reduce cost and increase overall performance.

The approach may thus implement a foreign object detection that utilizes one or more sets of balanced detection coils 207, 209, also referred to as so-called induction balances. In the specific example, two detection coils 207, 209 are positioned opposite of each other and in the same magnetic plane as the transmitter coil 103. If such an induction balance is exposed to a symmetrical detection electromagnetic field generated by the transmitter coil 103, the voltage at the terminals of the detection coils 207, 209 is in the ideal theoretical case substantially zero.

If a metal piece is put on one of the sides of the induction balance, as in FIG. 7, the density of the detection electromagnetic test signal/field is no longer symmetrical and a voltage can be measured at the terminals of the induction balance.

In general, with an induction balance system, the voltage measured at the terminals of the detection coils 207, 209 is very close to zero when the fields are symmetric through the coils. However, even for asymmetry due to a foreign object, the voltage may be very small and often in the region of e.g. 10 mV. Measuring and evaluating such small voltages accurately is very challenging. This is especially so in a noisy electromagnetic environment, such as that which is often experienced in a power transmitter where noise e.g. is generated by the high power switching inverter etc. Although shielding can improve the situation, it is still very difficult to generate sufficiently noise free measurement signals.

These issues may be mitigated in the described system where the first transformer 211 may be used as a current transformer effectively measuring the current through the detection coils 207, 209 of the induction balance(s). It may effectively allow a low ohmic short circuiting of the detection coils 207, 209 with the current being measured. In the approach, a signal is induced in each detection coil with balanced detection coils substantially compensating each other in case of a homogenous field (as typically is the case with no foreign object being present). The output of the detection coils 207, 209 is coupled to the first transformer 211. Thus, signals are induced (by the electromagnetic field generated by the transmitter coil) in the detection coils 207, 209 and the resulting (difference) induced signal across the output of the balanced detection coils 207, 209 is fed to the primary of first transformer 211. The resulting signal at the secondary signal is then evaluated by the foreign object detector 205. The signal evaluated by the foreign object detector 205 is thus a representation of the signals induced in the detection coils 207, 209, and specifically is the compensated difference/sum induced signal.

In the system, the secondary winding of the first transformer 211 is passively loaded. The secondary winding may be connected to a load circuit which provides a passive load to the secondary winding. The secondary winding may be connected to a circuit which does not provide any power or energy to the secondary winding. The signal/voltage/current in the secondary winding may originate only from a signal induced in the set or sets of balanced detection coils.

Equivalently, the set of balanced detection coils is passively loaded in the described system.

The set of balanced detection coils may be connected to a load circuit which provides a passive load to the set of balanced detection coils. The set of balanced detection coils may be connected to a circuit (including the first transformer) which does not provide any power to the set of balanced detection coils. The signal/voltage/current in the balanced detection coils may originate only from induction in the set or sets of balanced detection coils.

The foreign object detector may be arranged to detect the foreign object in response to a property of an induced signal from the first secondary winding meeting a foreign object detection criterion, the induced signal being a signal induced in the first set of balanced detection coils.

In many embodiments, the only energy/power exchanged between the windings of the first transformer 211 originates from induction in the detection coils 207, 209.

The approach of using a measurement transformer and in particularly a low impedance/current measurement coupled transformer may provide a number of advantages.

Indeed, the use of a transformer allows the systems to break spurious or unintended loops in which noise may be electromagnetically coupled. Indeed, the practical implementation requires that the detection coils are coupled to a measurement/foreign object detection circuit which typically results in quite long wires being required. This may result in large wire loops being formed in which emf voltages are induced by the prevalent magnetic field. However, for a power transfer system, there is often a high degree of electromagnetic noise and interference (e.g. the switching of the drive inverter tends to generate a substantial amount of electromagnetic noise) and this may be coupled in as noise to the detection and measurement system. In practice, this may provide a substantial noise component to a relatively sensitive measurement and may result in degraded performance.

The use of a measurement transformer allows the large connection loop to be broken and specifically may allow the loop to be converted into two smaller loops, namely the detection loop on the primary side of the first transformer 211 and the measurement loop on the secondary side of the first transformer 211. This not only reduces the effective area of each loop but also in practice allows an implementation with more design/implementation freedom which enables improved optimization to reduce the impact of noise.

In addition, the approach of low primary impedance/current measurement may provide improved noise performance and may reduce the noise propagation between the different loops.

For example, just using a direct measurement resistor coupled over the detection coils 207, 209 and measuring the voltage over this resistor will require a relatively large resistor in order to generate a sufficient voltage. However, this will also result in a high noise emf voltage being induced and overlaid the detection signal. The noise signal will be impacted by noise induced both in the detection loop and the measurement loop and this may degrade detection performance. Using a low turn ratio transformer may result in similar behavior and specifically may maintain a close connection between the two loops resulting in noise induced in one loop affecting the other loop (e.g. noise in the measurement loop will result in imbalance in the detection loop).

Using a high turn ratio current coupled transformer may improve performance. Specifically, it may provide a high detection voltage to the foreign object detection while maintaining a low voltage on the primary side. Further, noise pick-up in the detection loop will have a low impact on the detection voltage, since it may be filtered by the resonance circuit.

The noise which is picked up by the measurement loop will have very little impact on the operation of the detection loop as the voltage is reduced by the turn ratio, and accordingly it does substantially reduce any unbalancing effect. The approach allows the current in the detection loop to be increased/maximized while still allowing a detection voltage to be provided to the foreign object detection.

The use of a resonance capacitor, and specifically for forming a parallel resonance circuit, may further improve measurement/detection performance. It may specifically, provide a more accurate phase and/or amplitude detection due to an improved signal integrity resulting from the effective filtering reducing noise and providing a more sine wave shaped signal at the appropriate frequency. It also provides an attenuation of out-of-band signals and thus attenuates noise caused by other sources than the electromagnetic test signal.

As previously mentioned, the power transmitter is arranged to control the drive signal to exhibit different parameters during the foreign object detection time intervals than during the power transfer time intervals. This may in particular be exploited to reduce the effect and impact of the loading on the electromagnetic test signal by the power receiver.

It has been proposed to disconnect the load of the power receiver during short foreign object detection time intervals, e.g. by the power receiver being implemented with a switch that is actively opened for this purpose. For higher power levels in the kW range, this solution is however not ideal as the disconnection switch introduces additional losses and increases cost. Indeed, in some high power applications, it is simply not feasible to implement such switching, such as for example where the load is an induction-heated metallic element in which eddy currents are directly induced by the power transfer signal to cause heating.

The adaptation of parameters for the drive signals during the foreign object detection time interval relative to the power transfer time interval may address this and may be used to mitigate the effect of the load of the power receiver on the foreign object detection.

In many embodiments, the driver 201 is arranged to increase the frequency of the drive signal during the foreign object detection time intervals compared to during the power transfer time intervals, and specifically is arranged to set the drive signal frequency to be no less than 50% higher than the frequency of the drive signal during power transfer time interval. The driver 201 may accordingly generate the electromagnetic test signal to have a substantially higher frequency than the power transfer signal.

In many scenarios, increasing the frequency substantially may improve detection and reduce the impact of the power receiver load. For example, the power transmitter and power receiver may both have resonance circuits formed for the power transfer, e.g. the transmitter coil 103 and the receiver coil 107 may both be part of resonance circuits, e.g. with a resonance frequency of fres=25 kHz. Increasing the drive frequency during the foreign object detection time interval (e.g. to 50 kHz) will result in the power transmitter resonance circuit operating in an inductive mode resulting in a reduced current in the transmitter coil 103. Furthermore, the receiver coil current is also reduced because the system is no longer tuned. This will further reduce the power transmitter current. The overall effect will correspond to the effect that would result from a partly disconnected load. In many embodiments, the driver 201 may be arranged to reduce the voltage of the drive signal during the foreign object detection time intervals relative to the power transfer time interval, and specifically may set the voltage amplitude of the drive signal during the foreign object detection time intervals to be no higher than 50% (or often 25 or even 10%) of the voltage amplitude of the drive signal during the power transfer time intervals.

The reduced voltage may generate an electromagnetic test signal that has reduced intensity, and thus the electromagnetic field generated during the foreign object detection time intervals is lower than during the power transfer time interval and the loading by the load may be reduced correspondingly. This may in many scenarios allow improved detection. In some embodiments, the reduced voltage may be an advantage as it may result in a disconnection of the power receiver load. For example, if the voltage is reduced to a certain level, a power receiver including a rectifier and a battery will be driven by the battery as the induced voltage does not become sufficient for the rectifiers to conduct. This will effectively disconnect the load from the electromagnetic test signal which may improve foreign object detection performance.

In many embodiments, the driver 201 may be arranged to set the voltage amplitude of the drive signal to be constant during the foreign object detection time intervals. This may result in a more homogenous electromagnetic test signal being generated which may improve foreign object detection based on balanced detection coils 207, 209. For example, if the voltage amplitude is time varying, the detection signal will vary and unless this variation can be compensated for or taken into account, the detection accuracy will be reduced.

In many embodiments, the driver 201 may be arranged to generate the drive signal to during the foreign object detection time interval have a voltage amplitude which is constant and at least 50% lower, and a frequency at least 50% higher, than the drive signal during the power transfer time interval.

As an example, during the power transfer time interval, the drive signal is generated with a first operating frequency close to the resonance frequency of both the power transmitter and the power receiver in order to transmit wireless power with high efficiency. During the foreign object detection time interval, a first operating frequency of the drive signal is moved away from the resonance frequency of both the power transmitter and the power receiver, to a second higher operating frequency. This second higher operating frequency of the drive signal may be fixed at a predetermined value which is at least a factor of 1.5 higher than the first operating frequency, i.e. the frequency of the power transfer signal.

In addition, the drive signal voltage Uinv is changed to a second amplitude (e.g. provided by a different voltage source) which is constant and lower than during the power transfer time interval.

With the drive signal having the second higher operating frequency and the second lower and constant voltage amplitude, the current through the transmitter coil 103 coil is strongly reduced and kept constant. Furthermore, because the driver current is lagging the driver signal voltage, switching noise is strongly reduced because the inverter at the output of the driver 201 operates in a zero voltage switching scenario.

Figure 8:
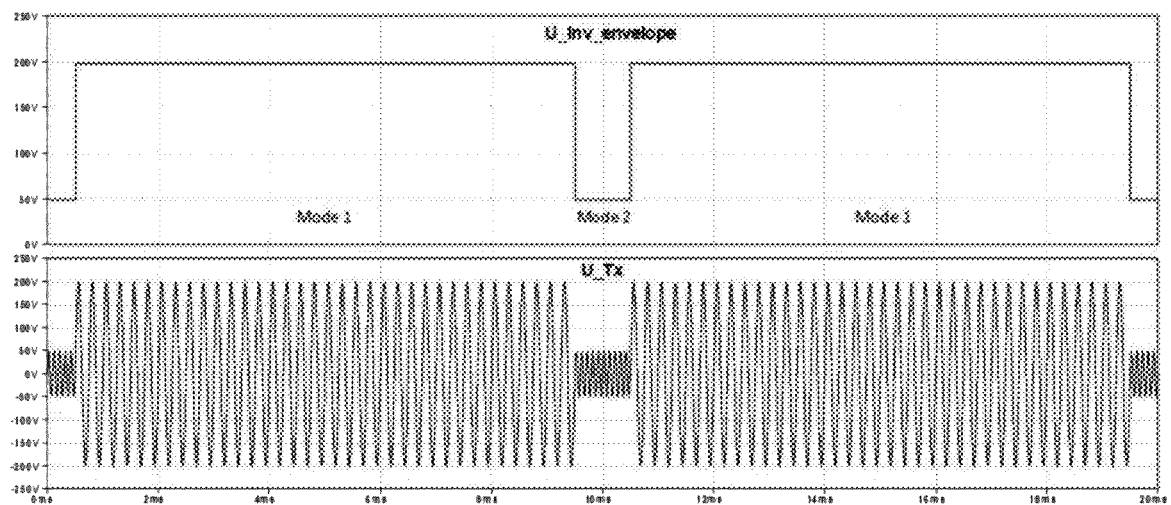
FIG. 8 illustrates an example of a drive signal for a power transmitter in accordance with some embodiments of the invention.

An example of the drive signal amplitude for such a scenario, is shown in FIG. 8 where the operation during power transfer time interval is referred to as Mode 1 and the operation during foreign object detection time interval is referred to as Mode 2. In this example, the voltage amplitude is also constant during the power transfer time interval, e.g. due to the inverter being supplied by a constant voltage source.

Figure 9:
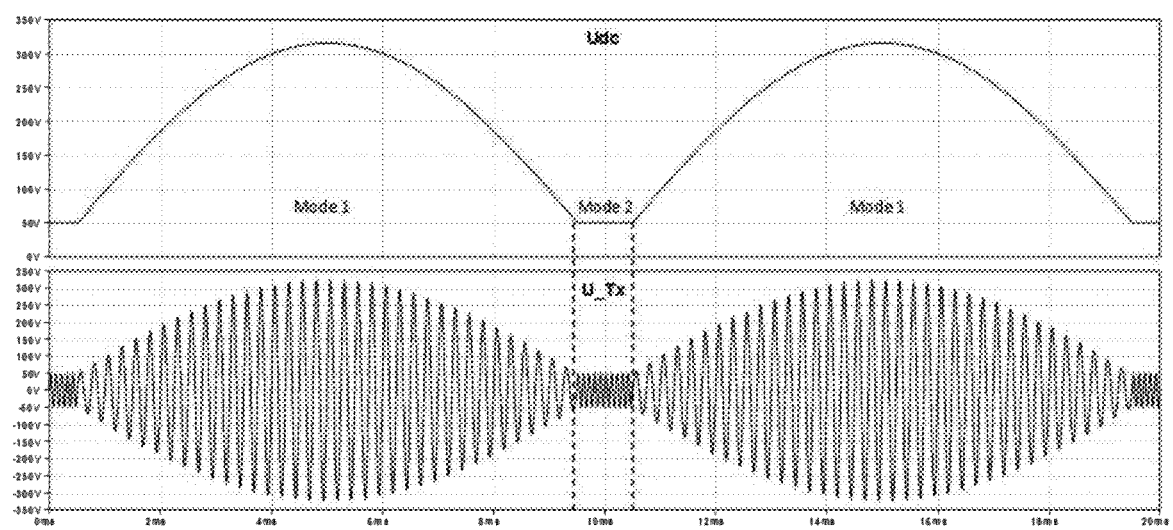
FIG. 9 illustrates an example of a drive signal for a power transmitter in accordance with some embodiments of the invention.
Figure 10:
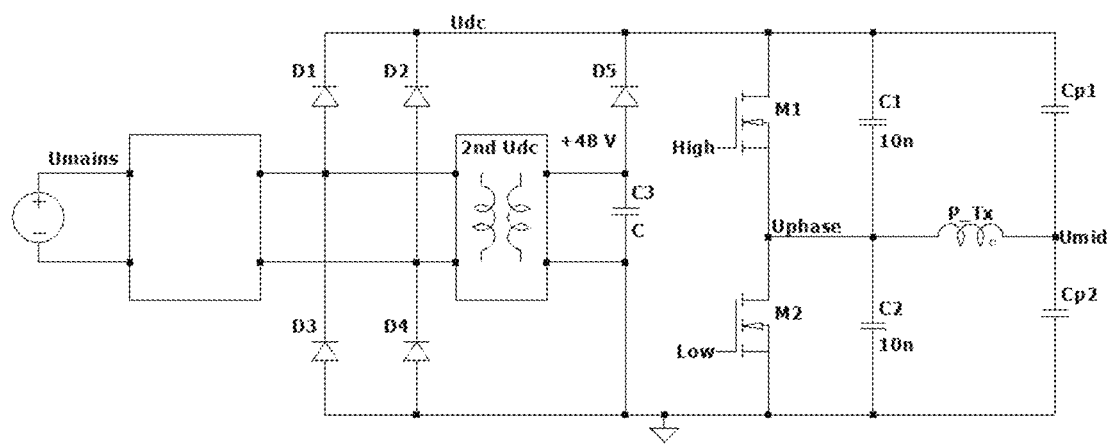
FIG. 10 illustrates an example of elements of a power transmitter in accordance with some embodiments of the invention.

FIG. 9 illustrates a corresponding example where the voltage amplitude is varied during the power transfer time interval. This may for example be achieved by the inverter being supplied by a voltage which is a rectified (but not smoothed) AC voltage. The supply voltage during foreign object detection time intervals, which may be synchronized with the zero crossings of the AC signal, is provided through an alternative power supply which provides a substantially constant voltage. An example of a circuit that may generate such a drive signal is illustrated in FIG. 10. In the circuit, the output inverter circuit (M1, M2, Cp1, Cp2) is driven by a rectified AC mains voltage, except when the rectified voltage falls below a given voltage (in the example 48V) of a smoothing capacitor C3 fed by a second supply circuit ($2^{nd}$ Udc). During this time, the inverter circuit is supplied by the smoothing capacitor C3 via D5 resulting in a substantially constant supply voltage and consequently constant drive signal voltage amplitude.

In such examples, the transmitter coil 103 generates an electromagnetic test signal corresponding to a substantially constant electromagnetic field for foreign object detection during the foreign object detection time interval with the electromagnetic test signal having the predetermined higher second operating frequency. The amplitude of the foreign object detection electromagnetic field/electromagnetic test signal is mainly determined by the second lower output voltage of the driver 201. In this case, a non-disconnected load of a power receiver is effectively detuned from the power transmitter and therefore it has a reduced impact on the electromagnetic field/electromagnetic test signal.

In practice, the detection coils 207, 209 may be generated to be as identical as possible and may be designed to cancel as much as possible. However, in practice, it has been found that there tends to be some asymmetry and differences in the parameters of the detection coils 207, 209 as well as possibly in the electromagnetic environment even in the presence of no foreign objects. Further, the asymmetry and imbalance may in many scenarios result in a combined voltage over the detection coils 207, 209 being in the same order of magnitude as the voltage caused by some foreign objects that are desired to be detected. Therefore, even using balanced inductance/detection coils may in many embodiments result in difficult or less than ideal detection performance.

Figure 11:
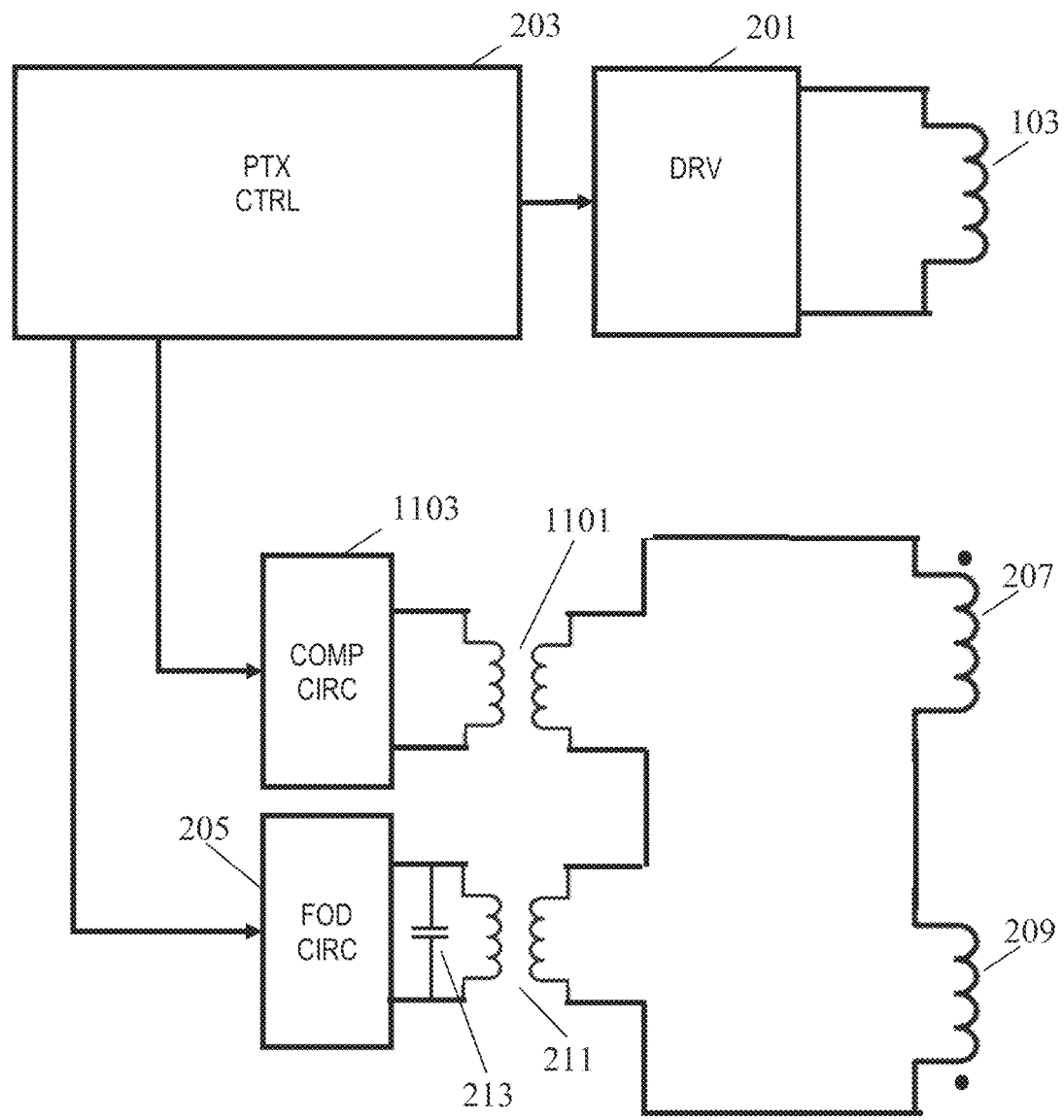
FIG. 11 illustrates an example of elements of a power transmitter in accordance with some embodiments of the invention.

FIG. 11 illustrates an example where the power transmitter of FIG. 2 further comprises a compensation circuit arranged to compensate for imperfections in the balanced operation of the balanced detection coils 207, 209. The compensation circuit specifically comprises a transformer, henceforth referred to as the compensation transformer 1101, which has a secondary winding (henceforth also referred to as the compensation secondary winding) which is coupled in series with the set of balanced detection coils, i.e. with the detection coils 207, 209.

The primary winding (henceforth also referred to as compensation primary winding) is coupled to a compensation circuit 1103 which is arranged to generate a compensation drive signal for the second primary winding. The compensation drive signal is generated such that it offsets/at least partially cancels the combined voltage of the detection coils 207, 209. Specifically, the compensation drive signal is generated to offset (at least partially cancel), the induced voltages from an undistorted electromagnetic test field/signal generated by the transmitter coil 103. Thus, if no foreign object is present, the compensation drive signal is generated to reduce the combined voltage over the compensation secondary winding and the detection coils 207, 209 relative to the combined voltage over the detection coils 207, 209.

The compensation drive signal may be generated to offset the voltage over the detection coils 207, 209 when no foreign object is present. Specifically, in the system of FIG. 11, the compensation drive signal is generated such that the compensation secondary winding generates a voltage that offsets (has the opposite phase/polarity) of the combined voltage over the first detection coil 205 and the second detection coil 207. Thus, the voltage over the first transformer 211 (also henceforth referred to as the measurement transformer 211) is reduced by the compensation transformer 1101 and the generated compensation voltage.

It should also be noted that generating such a compensation signal that offsets the voltage difference between the induced voltage (emf) in the two detection coils result in a reduction of the current flowing in the series coupling, and thus the compensation circuit can equally be considered a current compensation/cancellation circuit.

The compensation circuit 1103 is coupled to the compensation primary winding and generates the compensation drive signal resulting in a compensation signal being produced at the compensation secondary winding to offset the signals induced in the detection coils 207, 209 (when no foreign object is present). The compensation signal is generated to have the same frequency as the drive signal/electromagnetic test signal, and to have substantially the opposite phase to the combined voltage of the detection coils 207, 209. Thus, if the voltage over the first detection coil 205 exceeds the voltage over the second detection coil 207 then the compensation signal/compensation drive signal is generated to have a phase that is substantially the same as the voltage induced in the second detection coil 207 and opposite the phase of the voltage induced in the first detection coil 205. If the voltage over the second detection coil 207 exceeds the voltage over the first detection coil 205 then the compensation signal/compensation drive signal is generated to have a phase that is substantially the same as the voltage induced in the first detection coil 205 and opposite the phase of the voltage induced in the second detection coil 207.

In the system of FIG. 11, the compensation transformer 1101 is arranged to have a winding ratio where the number of turns on the primary winding is substantially higher than the number of turns on the secondary winding. In many embodiments, the number of turns of the primary winding is no less than 10, 20, 50, or 100 times higher than the number of turns on the secondary winding.

The compensation transformer 1101 may thus provide a very large impedance transformation such that even a relatively high impedance on the primary winding will result in a very low impedance on the secondary winding. Thus, the secondary winding may generate a signal with low voltage and high current, corresponding to a low impedance. Thus, the compensation approach maintains the current focused detection and supports a detection loop with very low impedance.

Figure 12:
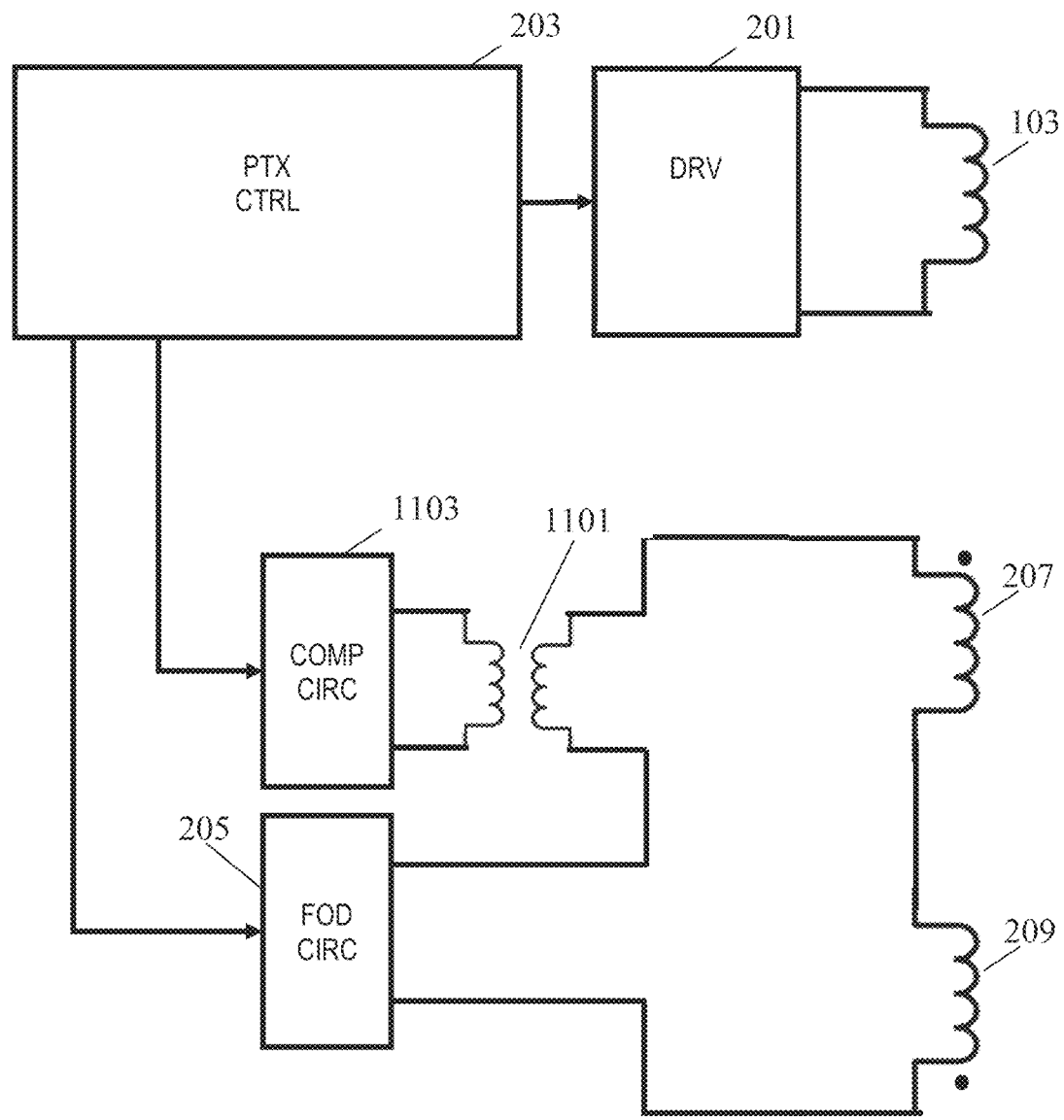
FIG. 12 illustrates an example of elements of a power transmitter in accordance with some embodiments of the invention.

The circuit may comprise other components and elements but in the specific example, the coupling between the detection coils 207, 209 and the secondary winding of the compensation transformer 1101 is low ohmic. In most embodiments, the combined resistance of the coupling between the detection coils 207, 209 and the secondary winding is less than 100 Ohm, and in many embodiments less than 50 Ohm, 10 Ohm, 5 Ohm, or even 1 Ohm in many embodiments. In many embodiments, the secondary winding may, as shown in FIGS. 11 and 12, be coupled directly to the detection coils 207, 209.

In the approach of FIG. 11, the compensation drive signal, and accordingly the compensation signal, are generated to have a frequency that is the same as the drive signal and as such the same as the electromagnetic test signal. The phase and/or amplitude may be set to values that provide the desired compensation.

In some embodiments, the phase and/or amplitude may be predetermined values. For example, during manufacturing or design, the asymmetry between the detection coils 207, 209 with respect to the generated electromagnetic test signal may be estimated (based on a theoretical analysis and/or measurements) and suitable compensation drive signal parameter values may be determined. These may then be applied during foreign object detection time intervals.

In many embodiments, the compensation circuit 1103 may however be arranged to dynamically adapt a parameter of the drive signal and specifically may be arranged to adapt the voltage amplitude and/or the phase of the drive signal.

This may in many embodiments provide improved compensation/cancellation. Indeed, even if the detection coils 207, 209 were perfectly balanced and/or perfectly characterized during a manufacturing phase, the electromagnetic field and thus the induced signals will also depend on the specific environment and in particular will tend to vary depending on e.g. which power receiving appliance is used and exactly where this is positioned. Therefore, being able to dynamically adapt the compensation and specifically to calibrate it to the current electromagnetic environment may substantially improve performance.

In many embodiments, the compensation circuit 1103 may be arranged to vary the parameter, specifically the phase or amplitude, of the drive signal to determine a reference parameter value for which the combined voltage over the compensation secondary winding, the first detection coil 205, and the second detection coil 207 is minimum. The compensation circuit 1103 may thus evaluate a range of candidate parameter values and determine the value(s) for which the cancellation is optimum in the present context.

In the specific example of FIG. 11, the compensation circuit 1103 may specifically be arranged to vary the voltage and phase of the compensation drive signal and to measure the output signal of the secondary winding of the measurement transformer 211. This may result in a highly efficient adaptive foreign object detection system that adapt to the current scenario/context.

It will be appreciated that whereas FIG. 11 describes the use of a compensation circuit 1103 together with the transformer based measurement approach of FIG. 2, it is not limited to this application. Rather, the compensation approach may be used with other foreign object detection approaches based on balanced detection coils. For example, as illustrated in FIG. 12, the compensation circuit 1103 could be used with a system that directly measures the voltage from the detection coils 207, 209 after compensation and without using a measurement transformer.

The described approach of using a compensation circuit which provides a compensation signal for the balanced detection coils 207, 209 is advantageous when used with the first transformer 211 as a measurement transformer. However, the compensation circuit may in general be advantageous for balanced detection coils 207, 209 and the approach is not dependent on the first transformer 211 being used or indeed on any measurement transformer being used. The approach may be used in many different embodiments regardless of how the measurement of the output of the detection coils 207, 209 is measured.

It will also be appreciated that described features and properties for the system using a first transformer 211 may also be suitable for embodiments where such a first transformer 211 is not used. For example, the previously described functions, features, and properties apply both to the system of FIG. 11 and of FIG. 12. E.g. the change in frequency or voltage described with reference to FIGS. 2 and 11 are also applicable to the system of FIG. 12.

The compensation may be useful to mitigate or reduce imbalances between detection coils and/or the environment around these. This may provide improved performance in many scenarios and may specifically provide a more accurate foreign object detection.

It may also in many embodiments allow or improve position estimation for a foreign object detection. Specifically, a foreign object position indication estimate may be generated by considering asymmetry between the signals induced in the two detection coils of a balanced set of detection coils. The phase and/or polarity of the output signal for a set of balanced detection coils may indicate to which of the detection coils the foreign object is positioned closer. For example, a foreign object on a surface of the power transmitter may result in an emf being induced with a certain polarity in an adjacent detection coil. The polarity of the output signal from the balanced set of detection coils may accordingly indicate which of the detection coils, the foreign object is positioned close to. The compensation may mitigate imbalances existing when no foreign object is present thereby allowing a more accurate determination of the impact of a foreign object, and thus a more accurate position estimation. It may for example detection of smaller imbalances thereby e.g. in particular allowing improved position estimation close to the overlap between the detection coils.

In the previous examples, embodiments have been described with only a single set of balanced detection coils. However, in other embodiments, a plurality of sets of balanced detection coils may be used, and the foreign object detection may be arranged to perform foreign object detection based on the output signals from one or more of these sets of balanced detection coils.

Figure 13:
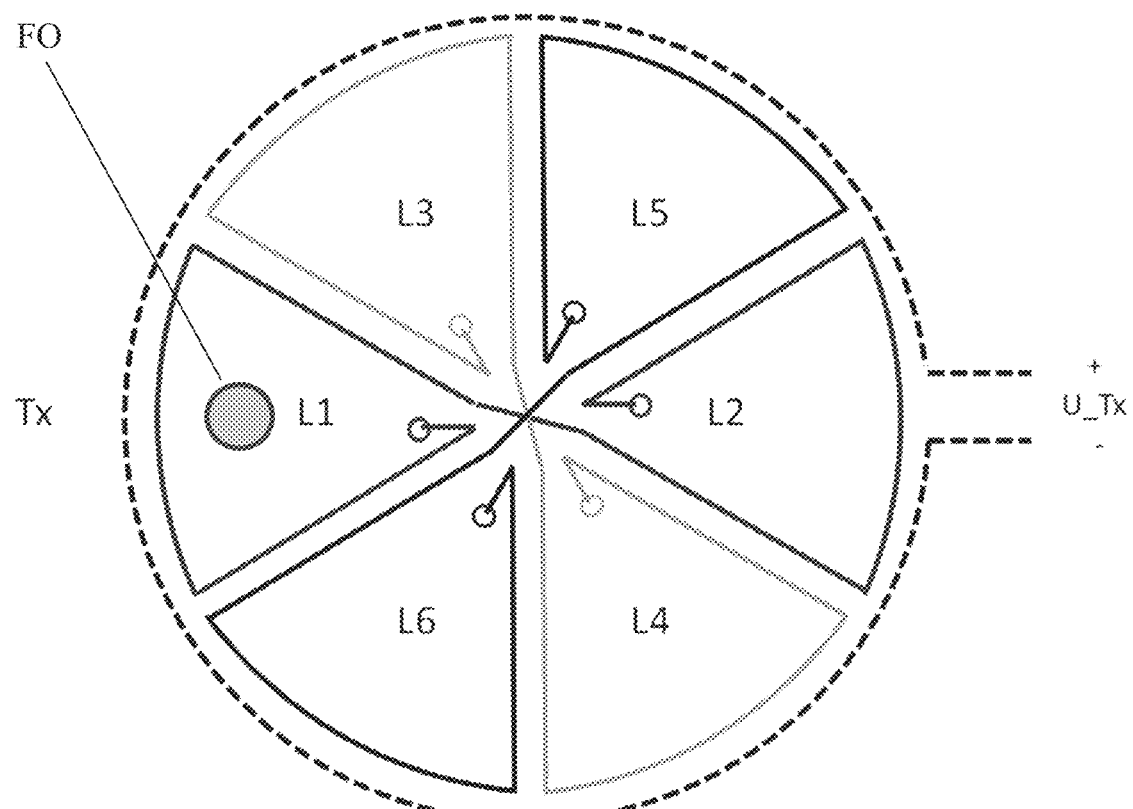
FIG. 13 illustrates an example of detection coils for a power transmitter in accordance with some embodiments of the invention.

For example, as illustrated in FIG. 13, the power transmitter may be generated to include three sets of balanced detection coils with each set comprising of two wedge shaped coils. In this example, the foreign object detection may measure the output signal from each of the three balanced detection coil pairs and use these to perform a foreign object detection. The exact criterion used will depend on the preferences and requirements of the individual embodiment. As a low complexity example, a foreign object detection may be determined to be detected if at least one of the sets of balanced detection coils generates a signal exceeding a given threshold. In some embodiments, the different signals may be evaluated and compared e.g. to generate a position estimate for a detection foreign object.

In many embodiments, as indeed in the example of FIG. 13, the balanced detection coils are located within the transmitter coil 103. This may typically provide improved performance, and may in particular provide an electromagnetic test signal/field which is homogenous for the different coils.

Figure 14:
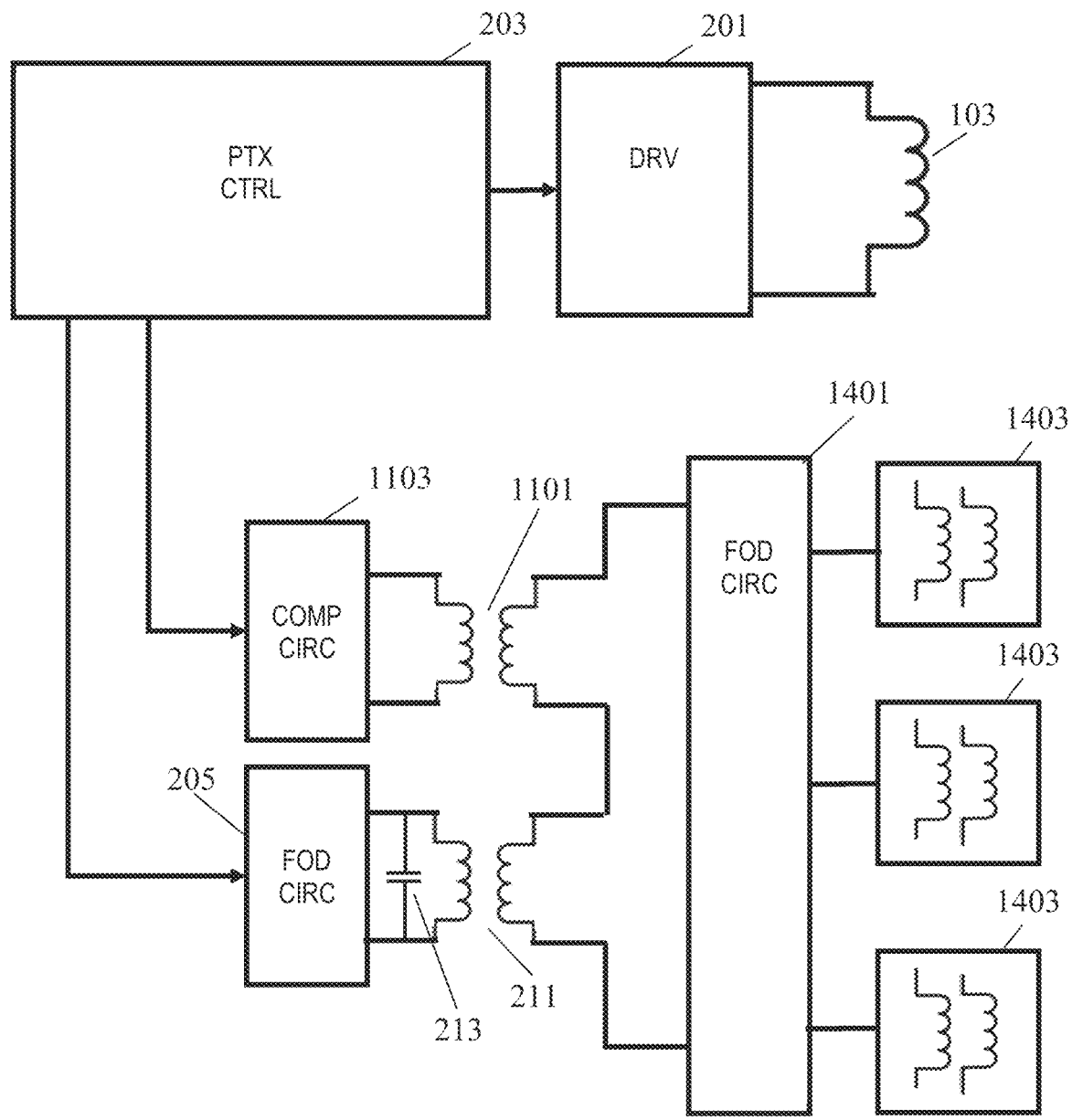
FIG. 14 illustrates an example of elements of a power transmitter in accordance with some embodiments of the invention.

In many embodiments, the plurality of sets of balanced detection coils is used with a single measurement transformer. Specifically, as shown in FIG. 14, the power transmitter may include a switch circuit 1401 coupled to the plurality of the sets of balanced detection coils 1403 (three of which are represented in FIG. 13).

In the example, the switch circuit 1401 is arranged to switch between coupling each of the sets of balanced detection coils 1403 to the measurement transformer 211. The switch circuit 1401 is specifically arranged to time sequentially couple one of the plurality of balanced detection coils 1403 to the primary winding of the measurement transformer 211. The coupling is such that the detection coils and the primary winding are coupled in series, i.e. the current through one of the coils is that same as the current through the other coils/winding.

The foreign object detector 205 may determine the voltage over the secondary of the measurement transformer 211 during each of the switch time intervals, i.e. the voltage of each set of balanced detection coils may be determined and used for the foreign object detection. Thus, a time sequential measurement may be performed, and the foreign object detection may be determined based on these measurements.

Further, as mentioned, the signals may be used to determine a position indication estimate for the foreign object in response to the properties of the signal from the secondary winding for at least two of the plurality of balanced detection coils being coupled to the first transformer. For example, if a foreign object FO is located on top of coil L1 (see FIG. 13) the induction balance is out of balance and a detection signal appears at the output from transformer 211 with a certain phase relation with respect to the phase reference signal. If the same foreign object is located on top of coil L2 (see FIG. 13) the induction balance is again out of balance but the detection signal from transformer 211 shows an opposite phase with respect to the phase reference signal.

The timing of the switching, and in particular the frequency of the switching, may vary between embodiments, and indeed may vary dynamically within one embodiment.

In some embodiments, the switch circuit 1401 may be arranged to switch between coupling different sets of balanced detection coils to the primary winding of the mapper 203 between consecutive foreign object detection time intervals.

Specifically, the approach may sequentially measure one set of balanced detection coils in each foreign object detection time interval and often in each frame. This may allow an increased duration and thus more accurate measurement. It may also allow reduced requirements on the switching which may be performed relatively slowly during e.g. the power transfer time interval.

In other embodiments, the switch circuit 1401 may be arranged to switch between coupling different sets of balanced detection coils of the plurality of balanced detection coils to the first primary winding during one foreign object detection time interval. Thus, during one foreign object detection time interval, one, more, or all of the sets of balanced detection coils may be coupled to the measurement transformer 211 and the signal of the secondary winding may be measured by the foreign object detector 205.

This may provide a faster and more correlated measurement which in some embodiments may enable a more reactive or improved foreign object detection.

Figure 15:
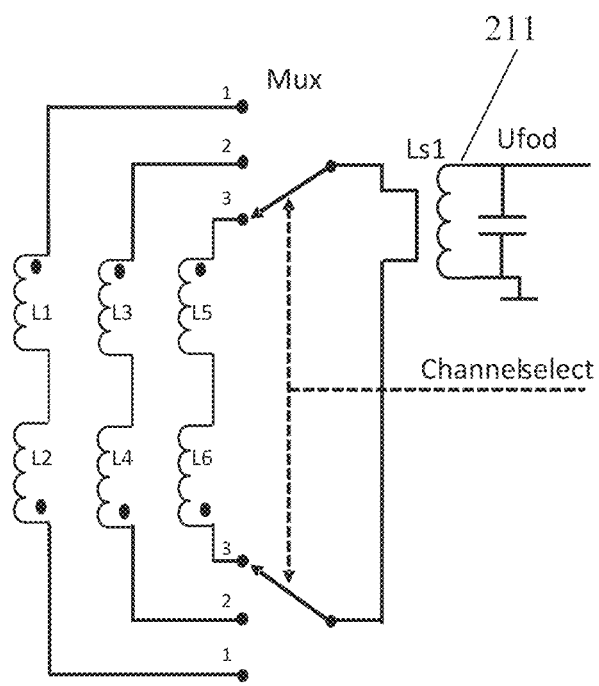
FIG. 15 illustrates an example of elements of a power transmitter in accordance with some embodiments of the invention.

FIG. 15 illustrates an example of a switch circuit 1401 principle for a scenario using three sets of balanced detection coils. In the example, the sets are sequentially scanned using a 3-channel multiplexer. Thus, in the approach only a single measurement transformer 211 is required and thus only one measurement signal path is needed thereby typically avoiding phase and/or amplitude measurement errors (offset, drift etc.)

Figure 16:
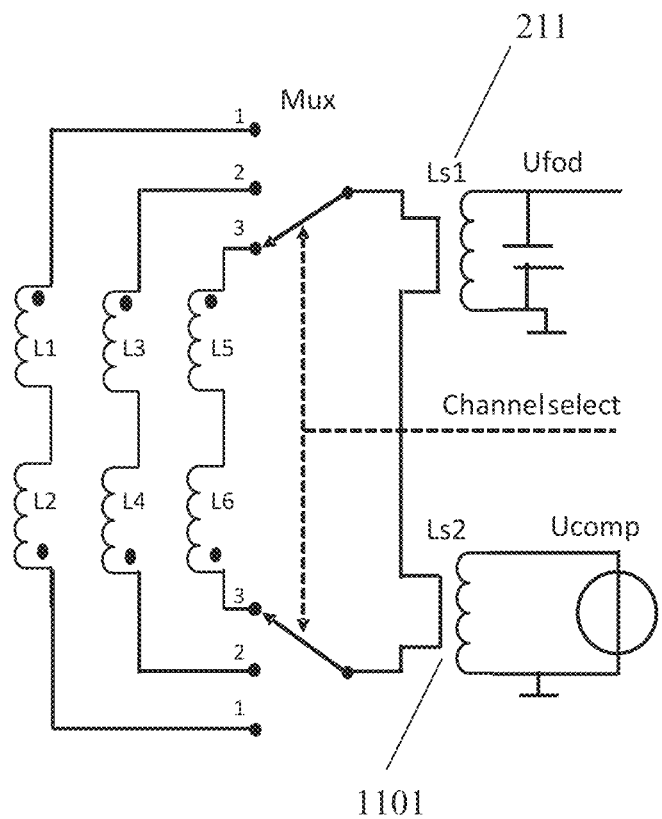
FIG. 16 illustrates an example of elements of a power transmitter in accordance with some embodiments of the invention.

FIG. 16 illustrates a corresponding example to FIG. 15 but with the addition of the compensation transformer 1101. Thus, measurement transformer 211 and the compensation transformer 1101 are coupled in series and are together switched between the different sets of balanced detection coils. In such a system, the compensation circuit 1103 may determine and store reference parameter values separately for each set of balanced detection coils. It may then retrieve the appropriate reference parameter values for the currently selected set of balanced detection coils and apply this to the generated compensation drive signal. Thus, the compensation circuit 1103 may apply different compensation drive signal parameters depending on which set of balanced detection coils is coupled to the primary winding of the measurement transformer 211. This may provide a substantially improved compensation in many embodiments leading to improved foreign object detection performance.

The specific approach may thus reduce or even remove the offset from the inductance balance measurement system. Due to construction tolerances, coil layout etc., the measurement transformer 211 secondary winding voltage "Ufod" is typically not zero even when no foreign object is present inside the active magnetic field area of the transmitter coil 103. This offset signal can be in the same order of magnitude as the measured signal due to a foreign object. This makes detection of the foreign object difficult and equally significant, the location of the foreign object inside the active magnetic field area becomes difficult to determine.

The circuit of FIG. 16 adds an AC voltage Ucomp inside the common loop of the detection coils L1 to L6. The voltage Ucomp specifically has the same frequency as the power transfer signal, has a certain phase relation with the drive signal of the driver 201. Depending on which set of balanced detection coils is selected, this phase relation can vary.

Further, the voltage Ucomp has a certain amplitude. Depending on which set of balanced detection coils is selected, this amplitude can differ.

The voltage Ucomp may e.g. have a waveform corresponding to a symmetrical square wave, or it may e.g. be a sinusoidal or triangle waveform in many embodiments.

In many embodiments, the compensation voltage may be generated as a square wave voltage as this results in a triangle wave shaped compensation current. This will match the current in the coils since the transmitter coil 103 may typically be part of a resonance circuit that is driven in the inductive mode due to the drive frequency being higher than the resonance frequency. This results in a triangle waveform of the corresponding signals induced in the detection coils 207, 209.

In many embodiments, a drive frequency calibration approach may be used to adapt the frequency to provide improved waveform matching. Thus, in some embodiments, the compensation circuit 1103 may also be arranged to adapt the frequency of the generated compensation drive signal. For example, it may vary the frequency and select the frequency for which the measurement voltage from the measurement transformer 211 is minimized.

For example, for a 48 kHz compensation signal a PWM class D like amplifier with a (for instance) 480 kHz carrier may be used and adjusted to provide the desired voltage shape with higher resolution.

A specific example of the approach is described with reference to the power transmitter which is illustrated in FIG. 16 and which includes many of the previously described features.

In such a system, the power transmitter may initially calibrate the compensation system to reduce or preferably remove the offset for the different sets of balanced detection coils.

The power transmitter may first set the initial parameters for the calibration. The driver 201 may generate the drive signal with the second higher operating/drive frequency, e.g. as a symmetrical square wave. This second higher operating frequency may be set to the resonance frequency given by the inductance of the measurement transformer 211, Ls1 and the resonance capacitor C1. A suitable value may in some embodiments be e.g. 48 kHz. The voltage amplitude may be set to a constant voltage, such as e.g. 48V.

Figure 18:
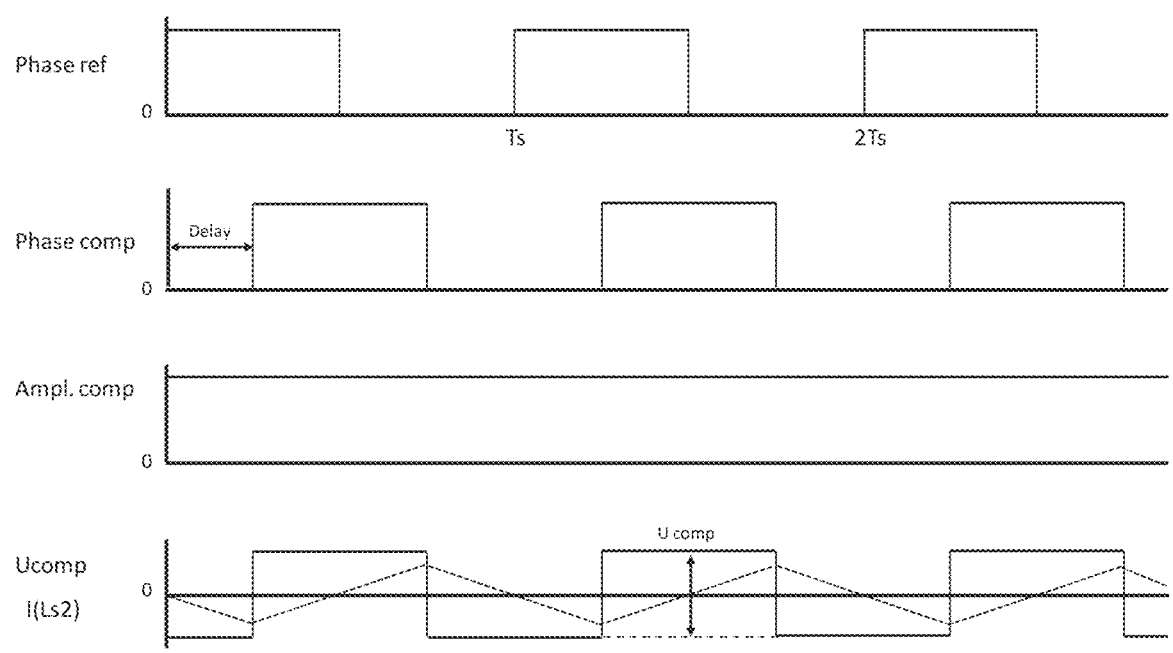
FIG. 18 illustrates an example of signals for a power transmitter in accordance with some embodiments of the invention.

The compensation circuit 1103 may then proceed to determine a suitable compensation signal for the first set of balanced detection coils (coils L1, L2) using the following approach:

The compensation circuit 1103 may first select the first detection coil pair L1-L2 via the "Channel select" port The compensation circuit 1103 may provide "Phase comp" and "Ampl. comp" signals as shown in FIG. 18 to the multiplier 1701.

Initially the "Phase comp" signal is in phase with respect to the "Phase ref" signal, the amplitude of "Ampl. comp" is adjusted to a relatively low level.

The compensation circuit 1103 may then increase the delay of the "Phase comp" signal with small steps over the full span of 360 degrees. The delay value at which the Offset voltage Ufod' has a minimum is stored in the compensation circuit 1103.

The compensation circuit 1103 uses this stored delay value and increases the amplitude of the signal "Ampl. comp" in small steps. Then it stores the value for which the Offset voltage has a minimum.

To reduce the time to find the optimum delay and amplitude values, step 4 and 5 can make use of successive approximation.

The stored phase/delay and amplitude values will then reflect the settings for which the Offset voltage Ufod' is minimized and thus for which the imbalance between the balanced detection coils has been maximally compensated for. The process may then be repeated for all sets of balanced detection coils.

The compensation circuit 1103 may then switch the multiplexer to the next set of balanced detection coils (L3, L4) and repeat the process to find compensation values for this set of balanced detection coils.

Figure 19:
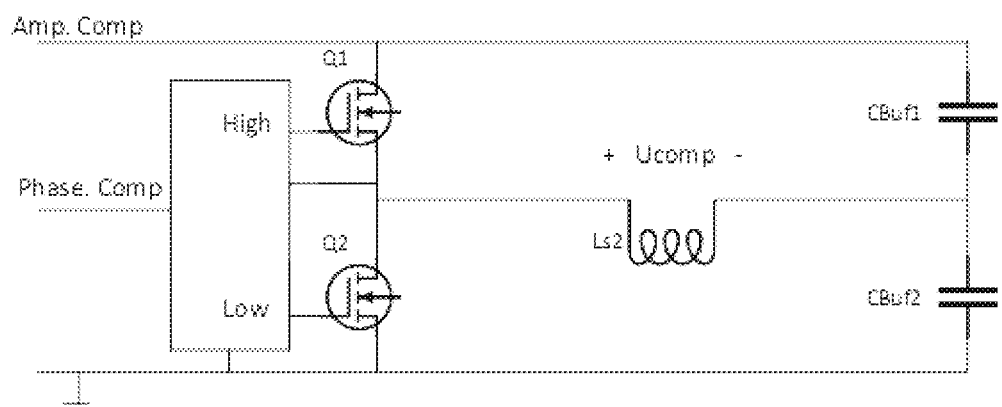
FIG. 19 illustrates an example of elements of a power transmitter in accordance with some embodiments of the invention.

FIG. 19 illustrates an example of an embodiment of the multiplier 1701. The example illustrates a switching multiplier built around a low power half bridge Inverter. Low power Mosfets Q1 and Q2 are driven in alternating mode with the symmetrical drive signal "Phase comp" shown in FIG. 18. The instantaneous output voltage Ucomp(t) of the multiplier 1701 is then given as:

$$U\text{comp}(t) = \text{Phase comp}(t) * \text{Ampl.comp}$$

With the capacitors CBuf1 and CBuf2 the DC component of the voltage Ufod(t) is removed thereby resulting in the compensation transformer 1101 being driven by an AC voltage.

It will be appreciated that other approaches for adapting the phase/delay and/or amplitude of the compensation signal may be used in other embodiments.

After the initial calibration (performed when it is known that no foreign object is present), foreign object detection may be performed during foreign object detection time intervals.

Figure 20:
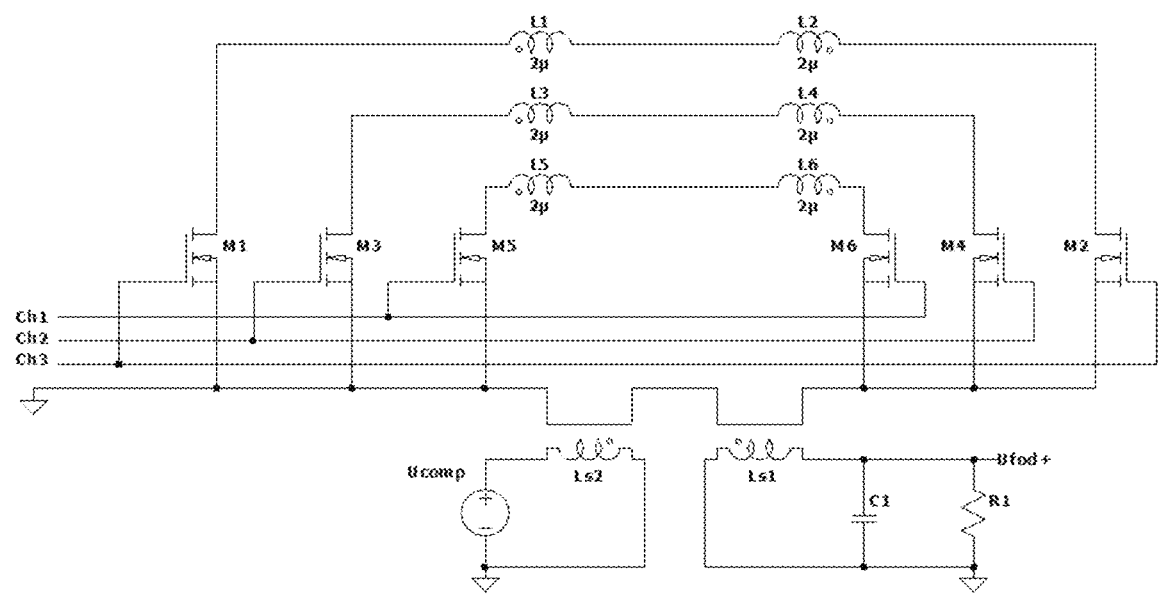
FIG. 20 illustrates an example of elements of a power transmitter in accordance with some embodiments of the invention.

As a specific example, the foreign object detector 205 may scan the three sets of balanced detection coils sequentially using a 3-channel multiplexer. An example of a possible implementation using such MOSFETs is shown in FIG. 20. The scanning may be performed in a single foreign object detection time interval or may be split over multiple foreign object detection time intervals.

Figure 17:
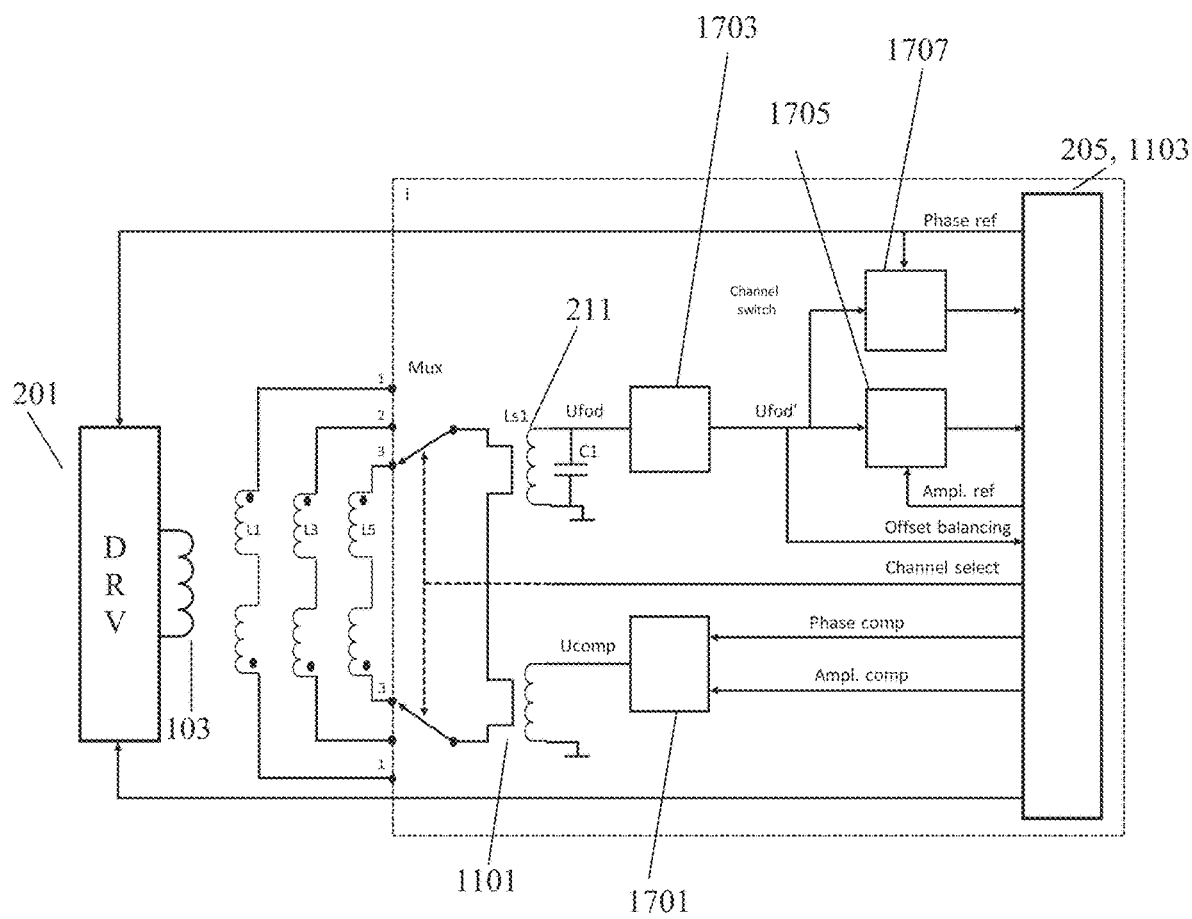
FIG. 17 illustrates an example of elements of a power transmitter in accordance with some embodiments of the invention.

Due to the resonance circuit, the signal Ufod is sinusoidal and is amplified by the amplifier 1703 to generate the amplified signal Ufod'. This signal is fed to a phase detector 1705 and a comparator 1707. It will be appreciated that although separately shown in FIG. 17, these functions are typically considered to be part of the compensation circuit 1103.

If the phase detector 1705 detects a phase difference between the signals Ufod' and "Phase ref" higher than a predetermined value, a foreign object is determined to be detected and the compensation circuit 1103 may e.g. switch the driver 201 to an off state and terminate the power transfer.

If the amplitude of signal Ufod' becomes higher than a predetermined value "Ampl. ref", the comparator 1707 sends a control signal to the compensation circuit 1103. In this case, a foreign object is again determined to be detected and the compensation circuit 1103 may switch the driver 201 to an off state and terminate the power transfer.

It will be appreciated that the above description for clarity has described embodiments of the invention with reference to different functional circuits, units and processors. However, it will be apparent that any suitable distribution of functionality between different functional circuits, units or processors may be used without detracting from the invention. For example, functionality illustrated to be performed by separate processors or controllers may be performed by the same processor or controllers. Hence, references to specific functional units or circuits are only to be seen as references to suitable means for providing the described functionality rather than indicative of a strict logical or physical structure or organization.

The invention can be implemented in any suitable form including hardware, software, firmware or any combination of these. The invention may optionally be implemented at least partly as computer software running on one or more data processors and/or digital signal processors. The elements and components of an embodiment of the invention may be physically, functionally and logically implemented in any suitable way. Indeed the functionality may be implemented in a single unit, in a plurality of units or as part of other functional units. As such, the invention may be implemented in a single unit or may be physically and functionally distributed between different units, circuits and processors.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term comprising does not exclude the presence of other elements or steps.

It will be appreciated that the reference to a preferred value does not imply any limitation beyond it being the value determined in the foreign object detection initialization mode, i.e. it is preferred by virtue of it being determined in the adaptation process. The references to a preferred value could be substituted for references to e.g. a first value.

Furthermore, although individually listed, a plurality of means, elements, circuits or method steps may be implemented by e.g. a single circuit, unit or processor. Additionally, although individual features may be included in different claims, these may possibly be advantageously combined, and the inclusion in different claims does not imply that a combination of features is not feasible and/or advantageous. Also the inclusion of a feature in one category of claims does not imply a limitation to this category but rather indicates that the feature is equally applicable to other claim categories as appropriate. The inclusion of a feature in a dependent claim of one independent claim does not imply a limitation to this independent claim but rather indicates that the feature is equally applicable to other independent claims as appropriate. Furthermore, the order of features in the claims do not imply any specific order in which the features must be worked and in particular the order of individual steps in a method claim does not imply that the steps must be performed in this order. Rather, the steps may be performed in any suitable order. In addition, singular references do not exclude a plurality. Thus, references to "a", "an", "first", "second" etc. do not preclude a plurality. Reference signs in the claims are provided merely as a clarifying example shall not be construed as limiting the scope of the claims in any way.

The invention claimed is:

1. A power transmitter comprising:
   a transmitter coil;
   a driver circuit,
      wherein the driver circuit is arranged to generate a drive signal for the transmitter coil,
      wherein the driver circuit is arranged to generate the drive signal for the transmitter coil so as to generate a power transfer signal during at least one power transfer time interval of a repeating time frame,
      wherein the driver coil is arranged to generate the drive signal for the transmitter coil so as to generate an electromagnetic test signal during at least one foreign object detection time interval of the repeating time frame;
   a first plurality of balanced detection coils coupled in series,
      wherein the first plurality of balanced detection coils comprises a first detection coil and a second detection coil,
      wherein the first detection coil and the second detection coil are arranged such that a first signal induced in the first detection coil by an electromagnetic field generated by the transmitter coil is compensated by a second signal induced in the second detection coil by the electromagnetic field generated by the transmitter coil;
   a foreign object detector circuit coupled to the first plurality of balanced detection coils,
      wherein the foreign object detector circuit is arranged to perform foreign object detection during the foreign object detection time interval,
      wherein the foreign object detector circuit is arranged to detect a foreign object in response to a property of a signal meeting a foreign object detection criterion,
      wherein the signal is from the first plurality of balanced detection coils; and
   a compensation circuit,
      wherein the compensation circuit is arranged to generate a compensation drive signal,
      wherein the compensation drive signal offsets a combined voltage of the first plurality of detection coils.

2. The power transmitter of claim 1,
   wherein the compensation drive signal has a compensation frequency,
   wherein the drive signal has a drive frequency,
   wherein the compensation frequency matches the drive frequency during the foreign object detection time intervals.

3. The power transmitter of claim 1,
   wherein the compensation circuit is arranged to dynamically adapt a parameter of the drive signal,
   wherein the parameter is at least one of a voltage, an amplitude and a phase of the drive signal.

4. The power transmitter of claim 1, further comprising:
   at least two pluralities of balanced detection coils,
      wherein the at least two pluralities of balanced detection coils comprises the first plurality of balanced detection coils and at least a second plurality of balanced detection coils,
      wherein the second plurality of balanced detection coils comprises a third detection coil and a fourth detection coil,
      wherein the third detection coil and the fourth detection coil are arranged such that signals induced in the first detection coil by an electromagnetic field generated by the transmitter coil is compensated by a second signal induced in the second detection coil by the electromagnetic field generated by the transmitter coil;
   a switch circuit, wherein the switch circuit is arranged to time sequentially couple one of the at least two pluralities of balanced detection coils to a secondary winding via a series coupling,
   wherein the compensation circuit is arranged to apply different parameter values for the drive signal depending on whether the first plurality or the second plurality is coupled to the secondary winding.

5. The power transmitter of claim 1, wherein the drive signal has a first frequency during the foreign object detection time interval and a second frequency during power transfer time interval,
   wherein the first frequency is at least 50% higher than the second frequency.

6. The power transmitter of claim 1,
   wherein the drive signal has a first voltage amplitude during the foreign object detection time interval and a second voltage amplitude during power transfer time intervals,
   wherein the first voltage amplitude is at most 50% of the second voltage amplitude.

7. The power transmitter of claim 1, wherein a voltage amplitude of the drive signal is constant during the foreign object detection time interval.

8. A method of operation of a power transmitter wherein the power transmitter comprises:

a transmitter coil;
a first plurality of balanced detection coils coupled in series,
wherein the first plurality of balanced detection coils comprises a first detection coil and a second detection coil,
wherein the first detection coil and the second detection coil are arranged such that a first signal induced in the first detection coil by an electromagnetic field generated by the transmitter coil is compensated by a second signal induced in the second detection coil, the method comprising:
generating a drive signal for the transmitter coil,
wherein the generating comprises generating the drive signal for the transmitter coil so as to generate a power transfer signal during at least one power transfer time interval of a repeating time frame,
generating the drive signal for the transmitter coil so as to generate an electromagnetic test signal during at least one foreign object detection time interval of the repeating time frame;
detecting a foreign object in response to a property of a signal meeting a foreign object detection criterion, wherein the signal is from the first plurality of balanced detection coils;
generating a compensation drive signal, wherein the compensation drive signal offsets a combined voltage of the first plurality of detection coils.

9. A power transmitter comprising:
a transmitter coil;
a driver circuit,
wherein the driver circuit is arranged to generate a drive signal for the transmitter coil,
wherein the driver circuit is arranged to generate the drive signal for the transmitter coil so as to generate a power transfer signal during at least one power transfer time interval of a repeating time frame,
wherein the driver circuit is arranged to generate the drive signal for the transmitter coil so as to generate an electromagnetic test signal during at least one foreign object detection time interval of the repeating time frame;
a first plurality of balanced detection coils coupled in series,
wherein the first plurality of balanced detection coils comprises a first detection coil and a second detection coil,
wherein the first detection coil and the second detection coil are arranged such that a first signal induced in the first detection coil by an electromagnetic field generated by the transmitter coil is compensated by a second signal induced in the second detection coil by the electromagnetic field generated by the transmitter coil;
a foreign object detector circuit coupled to the first plurality of balanced detection coils,
wherein the foreign object detector circuit is arranged to perform foreign object detection during the foreign object detection time interval,
wherein the foreign object detector circuit is arranged to detect a foreign object in response to a property of a signal meeting a foreign object detection criterion, wherein the signal is from the first plurality of balanced detection coils;
wherein the drive signal has a first voltage amplitude during the foreign object detection time interval and a second voltage amplitude during power transfer time intervals,
wherein the first voltage amplitude is at most 25% of the second voltage amplitude.

10. A method of operation of a power transmitter the power transmitter comprising:
a transmitter coil;
a first plurality of balanced detection coils coupled in series,
wherein the first plurality of balanced detection coils comprises a first detection coil and a second detection coil,
wherein the first detection coil and the second detection coil are arranged such that a first signal induced in the first detection coil by an electromagnetic field generated by the transmitter coil is compensated by a second signal induced in the second detection coil by the electromagnetic field generated by the transmitter coil, the method comprising:
generating a drive signal for the transmitter coil so as to generate a power transfer signal during at least one power transfer time interval of a repeating time frame;
generating the drive signal for the transmitter coil so as to generate an electromagnetic test signal during at least one foreign object detection time interval of the repeating time frame;
performing foreign object detection during the foreign object detection time interval;
detecting a foreign object in response to a property of a signal meeting a foreign object detection criterion, wherein the signal is from the first plurality of balanced detection coils;
wherein the drive signal has a first voltage amplitude during the foreign object detection time interval and a second voltage amplitude during power transfer time intervals,
wherein the first voltage amplitude is at most 25% of the second voltage amplitude.

11. A power transmitter comprising:
a transmitter coil;
a driver circuit,
wherein the driver circuit is arranged to generate a drive signal for the transmitter coil,
wherein the driver circuit is arranged to generate the drive signal for the transmitter coil so as to generate a power transfer signal during at least one power transfer time interval of a repeating time frame,
wherein the driver circuit is arranged to generate the drive signal for the transmitter coil so as to generate an electromagnetic test signal during at least one foreign object detection time interval of the repeating time frame;
a first plurality of balanced detection coils coupled in series,
wherein the first plurality of balanced detection coils comprises a first detection coil and a second detection coil,
wherein the first detection coil and the second detection coil are arranged such that a first signal induced in the first detection coil by an electromagnetic field generated by the transmitter coil is compensated by a second signal induced in the second detection coil by the electromagnetic field generated by the transmitter coil;
a foreign object detector circuit, wherein the foreign object detector circuit is arranged to perform foreign object detection during the foreign object detection time interval, wherein the foreign object detector circuit is arranged to detect a foreign object in response to a property of a signal meeting a foreign object detection criterion.

12. The power transmitter of claim 11, further comprising at least two pluralities of balanced detection coils, wherein the at least two pluralities of balanced detection coils comprise the first plurality of balanced detection coils and at least a second plurality of balanced detection coils, wherein the second plurality of balanced detection coils comprises a third detection coil and a fourth detection coil, wherein the third detection coil and the fourth detection coil are arranged such that signals induced in the first detection coil by an electromagnetic field generated by the transmitter coil is compensated by a second signal induced in the second detection coil by the electromagnetic field generated by the transmitter coil;

wherein and the foreign object detector circuit is arranged to perform foreign object detection in response to an output signal from the second plurality of balanced detection coils.

13. The power transmitter of claim 12, further comprising a switch circuit, wherein the switch circuit is arranged to time sequentially couple at least one of the at least two pluralities of balanced detection coils to a secondary winding via a series coupling, wherein the foreign object detector circuit is arranged to perform the foreign object detection in response to properties of a detection signal, wherein the detection signal is from the secondary winding.

14. A power transmitter comprising:
a transmitter coil;
a driver circuit, wherein the driver circuit is arranged to generate a drive signal for the transmitter coil, wherein the driver circuit is arranged to generate the drive signal for the transmitter coil so as to generate a power transfer signal during at least one power transfer time interval of a repeating time frame, wherein the driver coil is arranged to generate the drive signal for the transmitter coil so as to generate an electromagnetic test signal during at least one foreign object detection time interval of the repeating time frame;

a first plurality of balanced detection coils coupled in series, wherein the first plurality of balanced detection coils comprises a first detection coil and a second detection coil, wherein the first detection coil and the second detection coil are arranged such that a first signal induced in the first detection coil by an electromagnetic field generated by the transmitter coil is compensated by a second signal induced in the second detection coil by the electromagnetic field generated by the transmitter coil;

a foreign object detector circuit coupled to the first plurality of balanced detection coils, wherein the foreign object detector circuit is arranged to perform foreign object detection during the foreign object detection time interval, wherein the foreign object detector circuit is arranged to detect a foreign object in response to a property of a signal meeting a foreign object detection criterion, wherein the signal is from the first plurality of balanced detection coils, wherein the drive signal has a first frequency during the foreign object detection time interval and a second frequency during power transfer time interval, wherein the first frequency is at least 50% higher than the second frequency.

* * * * *